United States Patent
Patton et al.

(10) Patent No.: US 11,552,982 B2
(45) Date of Patent: Jan. 10, 2023

(54) SYSTEMS AND METHODS FOR EFFECTIVE DELIVERY OF SIMULATED PHISHING CAMPAIGNS

(71) Applicant: KnowBe4, Inc., Clearwater, FL (US)

(72) Inventors: Mark William Patton, Clearwater, FL (US); Daniel Cormier, Clearwater, FL (US); Greg Kras, Dunedin, FL (US)

(73) Assignee: KnowBe4, Inc., Clearwater, FL (US)

( * ) Notice: Subject to any disclaimer, the term of this patent is extended or adjusted under 35 U.S.C. 154(b) by 0 days.

(21) Appl. No.: 17/001,070

(22) Filed: Aug. 24, 2020

(65) Prior Publication Data

US 2022/0060495 A1  Feb. 24, 2022

(51) Int. Cl.
*H04L 9/40* (2022.01)

(52) U.S. Cl.
CPC ...... *H04L 63/1433* (2013.01); *H04L 63/1483* (2013.01)

(58) Field of Classification Search
CPC ............... H04L 63/14; H04L 63/1408; H04L 63/1433; H04L 63/1441; H04L 63/1483
See application file for complete search history.

(56) References Cited

U.S. PATENT DOCUMENTS

| | | | |
|---|---|---|---|
| 8,615,807 B1 * | 12/2013 | Higbee | H04L 63/1483 726/25 |
| 8,635,703 B1 | 1/2014 | Belani et al. | |
| 8,719,940 B1 | 5/2014 | Higbee et al. | |
| 8,910,287 B1 | 12/2014 | Belani et al. | |
| 8,966,637 B2 | 2/2015 | Belani et al. | |
| 9,053,326 B2 | 6/2015 | Higbee et al. | |
| 9,246,936 B1 | 1/2016 | Belani et al. | |

(Continued)

FOREIGN PATENT DOCUMENTS

| | | |
|---|---|---|
| EP | 3 582 468 A1 | 12/2019 |
| WO | WO-2016/164844 A1 | 10/2016 |

OTHER PUBLICATIONS

Notice of Allowance on U.S. Appl. No. 17/002,340 dated Dec. 11, 2020.

(Continued)

*Primary Examiner* — Khang Do
(74) *Attorney, Agent, or Firm* — Foley & Lardner LLP

(57) ABSTRACT

Systems and methods are described for verifying whether simulated phishing communications are allowed to pass by a security system of an email system to email account of users. One or more email accounts of the email system with the security system may be identified to use for a delivery verification campaign. Further, one or more types of simulated phishing communications may be selected from a plurality of types of simulated phishing communications. The delivery verification campaign may be configured to include the selection of the one or more types of simulated phishing communications from the plurality of types of simulated phishing communications. The selected one or more types of simulated phishing communications of the delivery verification campaign may be communicated to the one or more email accounts. Further, whether or not each of the one or more types of simulated phishing communications was allowed by the security system to be received unchanged at the one or more email accounts.

19 Claims, 8 Drawing Sheets

(56) References Cited

U.S. PATENT DOCUMENTS

| | | | |
|---|---|---|---|
| 9,253,207 B2 | 2/2016 | Higbee et al. | |
| 9,262,629 B2 | 2/2016 | Belani et al. | |
| 9,325,730 B2 | 4/2016 | Higbee et al. | |
| 9,356,948 B2 | 5/2016 | Higbee et al. | |
| 9,398,038 B2 | 7/2016 | Higbee et al. | |
| 9,591,017 B1 | 3/2017 | Higbee et al. | |
| 9,667,645 B1 | 5/2017 | Belani et al. | |
| 9,749,360 B1* | 8/2017 | Irimie | H04L 51/18 |
| 9,781,160 B1* | 10/2017 | Irimie | H04L 63/1483 |
| 9,800,613 B1 | 10/2017 | Irimie et al. | |
| 9,876,753 B1 | 1/2018 | Hawthorn | |
| 9,912,687 B1 | 3/2018 | Wescoe et al. | |
| 10,243,904 B1* | 3/2019 | Wescoe | H04L 63/1433 |
| 10,453,017 B1 | 10/2019 | Richards et al. | |
| 10,699,234 B1 | 6/2020 | Richards et al. | |
| 10,880,325 B2 | 12/2020 | Sjouwerman | |
| 10,904,186 B1 | 1/2021 | Everton et al. | |
| 10,986,122 B2 | 4/2021 | Bloxham et al. | |
| 11,044,267 B2 | 6/2021 | Jakobsson et al. | |
| 11,184,393 B1 | 11/2021 | Gendre et al. | |
| 11,297,094 B2 | 4/2022 | Huda | |
| 2013/0167239 A1* | 6/2013 | Amit | H04L 63/1433 726/25 |
| 2014/0289532 A1 | 9/2014 | Kako | |
| 2015/0205953 A1 | 7/2015 | Belani et al. | |
| 2015/0229664 A1 | 8/2015 | Hawthorn et al. | |
| 2016/0164898 A1* | 6/2016 | Belani | H04L 63/1483 726/23 |
| 2016/0301705 A1 | 10/2016 | Higbee et al. | |
| 2016/0330238 A1 | 11/2016 | Hadnagy | |
| 2017/0126730 A1* | 5/2017 | Oberheide | H04L 63/1483 |
| 2017/0237776 A1 | 8/2017 | Higbee et al. | |
| 2017/0244746 A1 | 8/2017 | Hawthorn et al. | |
| 2017/0251009 A1* | 8/2017 | Irimie | H04L 63/1483 |
| 2017/0251010 A1* | 8/2017 | Irimie | H04L 63/1433 |
| 2017/0318046 A1* | 11/2017 | Weidman | H04L 63/1433 |
| 2017/0331848 A1* | 11/2017 | Alsaleh | H04L 63/1483 |
| 2018/0027014 A1* | 1/2018 | Irimie | H04L 63/1433 726/22 |
| 2018/0159889 A1 | 6/2018 | Sjouwerman | |
| 2018/0167409 A1* | 6/2018 | Irimie | H04L 63/1433 |
| 2018/0191776 A1 | 7/2018 | Irimie et al. | |
| 2018/0309764 A1 | 10/2018 | Kras et al. | |
| 2018/0324201 A1 | 11/2018 | Lowry et al. | |
| 2019/0005428 A1* | 1/2019 | Kras | G06Q 10/06314 |
| 2019/0028509 A1* | 1/2019 | Cidon | H04L 63/1425 |
| 2019/0034623 A1 | 1/2019 | Lowry et al. | |
| 2019/0171984 A1* | 6/2019 | Irimie | H04L 63/1483 |
| 2019/0173819 A1 | 6/2019 | Wescoe et al. | |
| 2019/0173917 A1 | 6/2019 | Sites | |
| 2019/0173918 A1* | 6/2019 | Sites | G06N 3/084 |
| 2019/0215335 A1 | 7/2019 | Benishti | |
| 2019/0245885 A1 | 8/2019 | Starink et al. | |
| 2019/0245894 A1 | 8/2019 | Epple et al. | |
| 2019/0364061 A1 | 11/2019 | Higbee et al. | |
| 2020/0053120 A1* | 2/2020 | Wilcox | G06Q 10/107 |
| 2020/0135049 A1* | 4/2020 | Atencio | G09B 19/0053 |
| 2020/0177612 A1* | 6/2020 | Kras | H04L 63/1433 |
| 2020/0233955 A1* | 7/2020 | Ramzan | G06F 21/552 |
| 2020/0267183 A1 | 8/2020 | Vishwanath | |
| 2020/0286015 A1 | 9/2020 | Richards et al. | |
| 2021/0021612 A1* | 1/2021 | Higbee | H04L 63/1491 |
| 2021/0075827 A1* | 3/2021 | Grealish | H04L 63/1483 |
| 2021/0090463 A1* | 3/2021 | Atencio | H04L 63/1433 |
| 2021/0092143 A1 | 3/2021 | Sbandi et al. | |
| 2021/0185075 A1 | 6/2021 | Adams | |
| 2021/0194924 A1 | 6/2021 | Heinemeyer et al. | |
| 2022/0060495 A1* | 2/2022 | Patton | H04L 63/1483 |
| 2022/0078207 A1 | 3/2022 | Chang et al. | |
| 2022/0094702 A1 | 3/2022 | Saad Ahmed et al. | |
| 2022/0100332 A1 | 3/2022 | Haworth et al. | |
| 2022/0116419 A1 | 4/2022 | Kelm et al. | |
| 2022/0130274 A1 | 4/2022 | Krishna Raju et al. | |

OTHER PUBLICATIONS

Notice of Allowance on U.S. Appl. No. 17/175,892 dated Apr. 14, 2021.

* cited by examiner

FIG. 3

SYSTEMS AND METHODS FOR EFFECTIVE DELIVERY OF SIMULATED PHISHING CAMPAIGNS

TECHNICAL FIELD

The present disclosure generally relates to systems and methods for facilitating simulated phishing campaigns. In particular, the systems and methods relate to effective delivery of a simulated phishing campaign to users.

BACKGROUND

Cybersecurity incidents such as phishing attacks may cost organizations in terms of loss of confidential and/or important information, and expenses in mitigating losses due to breach of confidential information. Such incidents can also cause customers to lose trust in the organization. The incidents of cybersecurity attacks and the costs of mitigating damages caused due to the incidents are increasing every year. Organizations invest in cybersecurity tools such as antivirus, anti-ransomware, anti-phishing and other quarantine platforms. Such cybersecurity tools may detect and intercept known cybersecurity attacks. However, social engineering attacks or new threats may not be readily detectable by such tools, and the organizations may have to rely on their employees to recognize such threats. Among the cybersecurity attacks, organizations have recognized phishing attacks as one of the most prominent threats that can cause serious breaches of data including confidential information such as intellectual property, financial information, organizational information and other important information. Attackers who launch phishing attacks may attempt to evade an organization's security apparatuses and tools, and target its employees. To prevent or to reduce the success rate of phishing attacks on employees, organizations may conduct security awareness training programs for their employees, along with other security measures. Through the security awareness training programs, organizations actively educate their employees on how to spot and report a suspected phishing attack. As a part of a security awareness training program, an organization may execute a simulated phishing campaign for its employees, to test and develop cybersecurity awareness of the employees. In an example, the organization may execute the simulated phishing campaign through a security awareness training system by sending out one or more simulated phishing communications periodically or occasionally to devices of employees and observe responses of employees to such simulated phishing communications. A simulated phishing communication may mimic a real phishing message and appear genuine to entice an employee to respond/interact with the simulated phishing communication. The simulated phishing communication may serve the purpose of training an employee to recognize phishing attacks and to gauge the security awareness of the employee based on an interaction of the employee with the simulated phishing communication (for example, by clicking on a link in the simulated phishing communication or opening an attachment in the simulated phishing communication) for further security awareness training. Based on the responses of the employees, the security awareness training system may gauge the security awareness of the employee and accordingly schedule trainings based on the security awareness of the employee.

Many email platforms such as Microsoft® Office 365™/Exchange Online™, Microsoft® Exchange™ on Premises, Google G-Suite®, and Amazon Workmail provide email security systems with a wide array of features that are designed to stop malicious messages (such as phishing attacks) from reaching users. One example of such email security system is Microsoft Advanced Threat Protection™ (ATP). The email security systems may be configured to identify and stop phishing emails from reaching a user's inbox. As a result, the email security systems may identify some or all of the simulated phishing communications in a simulated phishing campaign as malicious and may modify the simulated phishing communications or may block the delivery of the simulated phishing communications to the user's mailbox when delivering simulated phishing campaigns via Simple Mail Transfer Protocol (SMTP). The security awareness training system may be unaware that one or more simulated phishing communications from a simulated phishing campaign have been intercepted and may incorrectly categorize those simulated phishing communications as "not opened by user". Thus, the security awareness training system may assume that a user has passed a simulated phishing test because the simulated phishing communication was "not opened by user", when in fact the user never received the simulated phishing communication at all. As a result, the security awareness training system may assess the security awareness user as "good" and may provide a better risk score than the user actually deserves, which may subsequently lead to the organization believing that the user is a lower security risk than they actually are.

The email security system may also intercept simulated phishing communications and examine links within the simulated phishing communications to determine if they are harmful. This process may involve the email security system activating links within the simulated phishing communications in a sandbox (referred to as "robo-clicking" or "detonating" the links). The security awareness training system may categorize such simulated phishing communication as "user has clicked link" even though the user did not interact with the simulated phishing communication. In order to prevent the email security system from blocking delivery or otherwise modifying or interacting with the simulated phishing communications, a process called "whitelisting" may be used. The whitelisting process may involve providing the domain name or email addresses of senders to the email security system to "trust" emails coming from the domain name or the email addresses as "safe", and to allow the emails to intended recipients. As a result, the email security system may be configured to allow simulated phishing communications from the security awareness training system to be delivered to the user.

With evolving cybersecurity landscapes and introduction of new and more robust features to the email security system, for example with the introduction of new methods of detecting malicious emails, the whitelisting may be rendered ineffective and a need may be created for regular updating of the whitelisting. Regular updating may be onerous, require a lot of time of a system administrator and may add significantly to the existing workload of the system administrator. Additionally, some simulated phishing communications may be stopped by the email security system before the system administrator recognizes that the whitelisting is no longer effective, leading to development of a skewed perception of a user's security awareness as previously described. There is also the possibility of the email security system including features for post-delivery scanning and post-delivery removal of emails. Such features may negatively impact the reliability of delivery of simulated phishing communications.

SUMMARY

The present disclosure generally relates to methods and systems for verifying whether simulated phishing communications of a simulated phishing campaign are allowed to pass by a security system of an email system to the email accounts of the users. The security awareness training system can adapt the range of options (for example, phishing communication templates, type of phishing attacks, and type of attachments for the simulated phishing communications) that are presented to the system administrator for selection when the system administrator configures or designs the simulated phishing campaign based upon this verification.

Methods and systems are provided for verifying whether simulated phishing communications are allowed to pass by a security system of an email system to email account of users. In an example embodiment, a method for verifying whether simulated phishing communications allowed to pass by a security system of an email system to the email account of a user is described, which includes identifying one or more email accounts of the email system with the security system to use for a delivery verification campaign, selecting one or more types of simulated phishing communications from a plurality of types of simulated phishing communications, configuring the delivery verification campaign to include the selection of the one or more types of simulated phishing communications from the plurality of types of simulated phishing communications, communicating the one or more types of simulated phishing communications of the delivery verification campaign to the one or more email accounts, and determining whether or not each of the one or more types of simulated phishing communications was allowed by the security system to be received unchanged at the one or more email accounts.

In some implementations, the method includes determining that one or more types of simulated phishing communications were successfully communicated through the security system to the one or more email accounts.

In some implementations, the method includes determining that one or more types of simulated phishing communications were received unchanged at one or more email accounts.

In some implementations, the method includes accessing the one or more email accounts with credentials.

In some implementations, the method includes determining that one or more types of simulated phishing communications were not received at one or more email accounts.

In some implementations, the method includes identifying the type of one or more types of simulated phishing communications that were not received.

In some implementations, the further includes determining that one or more types of simulated phishing communications were not successfully communicated beyond the security system to the one or more email accounts.

In some implementations, the method includes accessing the one or more email accounts to examine one or more messages received in the one or more email accounts.

In some implementations, the plurality of types of simulated phishing communications include any of the following: simulated phishing email with attachment, simulated phishing email with one or more links and a simulated phishing email with a macro.

In some implementations, the method further configuring a simulated phishing campaign to a plurality of emails accounts of the email system based on the types of simulated phishing communications that were successfully communicated unmodified by the security system to the one or more email accounts.

In some implementations, the method includes displaying, for selection in configuring the simulated phishing campaign, types of simulated phishing communications that were successfully communicated unmodified by the security system to the one or more email accounts.

In another example embodiment, a system for verifying whether simulated phishing communications were allowed to pass by a security system of an email system to email account of users is described. The system identifies one or more email accounts of an email system with a security system to use for a delivery verification campaign, selects one or more types of simulated phishing communications from a plurality of types of simulated phishing communications, configures the delivery verification campaign to comprise the selection of the one or more types of simulated phishing communications from the plurality of types of simulated phishing communications, communicates the one or more types of simulated phishing communications of the delivery verification campaign to the one or more email accounts, and determines whether or not each of the one or more types of simulated phishing communications was allowed by the security system to be received unchanged at the one or more email accounts.

Other aspects and advantages of the invention will become apparent from the following detailed description, taken in conjunction with the accompanying drawings, which illustrate by way of example the principles of the invention.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 3 depicts a graphical user interface of an application for configuring a simulated phishing campaign, according to some embodiments.

DETAILED DESCRIPTION

For the purposes of reading the description of the various embodiments below, the following descriptions of the sections of the specifications and their respective contents may be helpful:

Section A describes a network environment and computing environment which may be useful for practicing embodiments described herein.

Section B describes systems and methods for delivering simulated phishing communications. In particular, the systems and the methods relate to delivering simulated phishing communications to a user's mailbox without being blocked, interacted, and/or modified by the email security system.

A. Computing and Network Environment

Figure 1A:
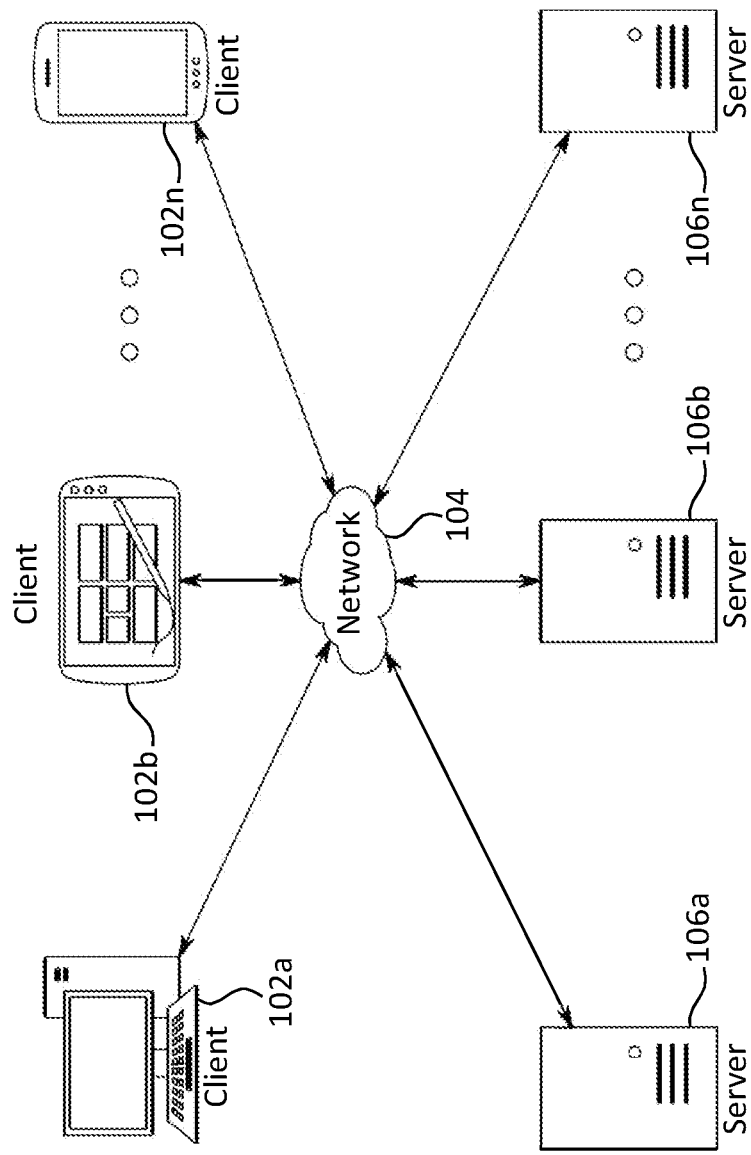
FIG. 1A is a block diagram depicting an embodiment of a network environment comprising client devices in communication with server devices, according to some embodiments.

Prior to discussing specific embodiments of the present solution, it may be helpful to describe aspects of the operating environment as well as associated system components (e.g. hardware elements) in connection with the methods and systems described herein. Referring to FIG. 1A, an embodiment of a network environment is depicted. In a brief overview, the network environment includes one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106) via one or more networks 104. In some embodiments, client 102 has the capacity to function as both a client node seeking access to resources provided by a server and as a server providing access to hosted resources for other clients 102a-102n.

Although FIG. 1A shows a network 104 between clients 102 and the servers 106, clients 102 and servers 106 may be on the same network 104. In some embodiments, there are multiple networks 104 between clients 102 and servers 106. In one of these embodiments, network 104' (not shown) may be a private network and a network 104 may be a public network. In another of these embodiments, network 104 may be a private network and a network 104' may be a public network. In still another of these embodiments, networks 104 and 104' may both be private networks.

Network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g. FDMA, TDMA, CDMA, or SDMA. In some embodiments, different types of data may be transmitted via different links and standards. In other embodiments, the same types of data may be transmitted via different links and standards.

Network 104 may be any type and/or form of network. The geographical scope of the network may vary widely and network 104 can be a body area network (BAN), a personal area network (PAN), a local-area network (LAN), e.g. Intranet, a metropolitan area network (MAN), a wide area network (WAN), or the Internet. The topology of network 104 may be of any form and may include, e.g., any of the following: point-to-point, bus, star, ring, mesh, or tree. Network 104 may be an overlay network which is virtual and sits on top of one or more layers of other networks 104'. Network 104 may be of any such network topology as known to those ordinarily skilled in the art capable of supporting the operations described herein. Network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. Network 104 may be a type of broadcast network, a telecommunications network, a data communication network, or a computer network.

In some embodiments, the system may include multiple, logically-grouped servers 106. In one of these embodiments, the logical group of servers may be referred to as a server farm or a machine farm. In another of these embodiments, servers 106 may be geographically dispersed. In other embodiments, a machine farm may be administered as a single entity. In still other embodiments, the machine farm includes a plurality of machine farms. Servers 106 within each machine farm can be heterogeneous—one or more of servers 106 or machines 106 can operate according to one type of operating system platform (e.g., Windows, manufactured by Microsoft Corp. of Redmond, Wash.), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In the embodiment, consolidating servers 106 in this way may improve system manageability, data security, the physical security of the system, and system performance by locating servers 106 and high-performance storage systems on localized high-performance networks. Centralizing servers 106 and storage systems and coupling them with advanced system management tools allows more efficient use of server resources.

Servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alta, Calif.; the Xen hypervisor, an open source product whose development is overseen by Citrix Systems, Inc. of Fort Lauderdale, Fla.; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, Calif. Additional layers of abstraction may include Container Virtualization and Management infrastructure. Container Virtualization isolates execution of a service to the container while relaying instructions to the machine through one operating system layer per host machine. Container infrastructure may include Docker, an open source product whose development is overseen by Docker, Inc. of San Francisco, Calif.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
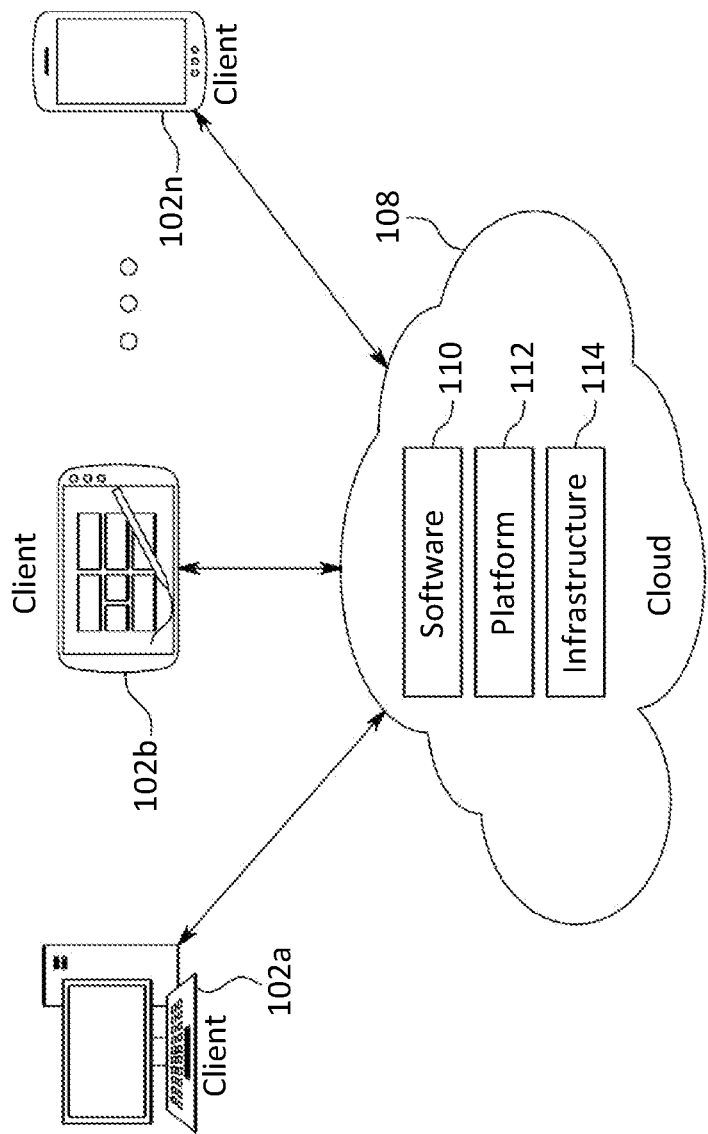
FIG. 1B is a block diagram depicting a cloud computing environment comprising client devices in communication with cloud service providers, according to some embodiments.

Referring to FIG. 1B, a cloud computing environment is depicted. A cloud computing environment may provide client 102 with one or more resources provided by a network environment. The cloud computing environment may include one or more clients 102a-102n, in communication with cloud 108 over one or more networks 104. Clients 102 may include, e.g., thick clients, thin clients, and zero clients. A thick client may provide at least some functionality even when disconnected from cloud 108 or servers 106. A thin client or zero client may depend on the connection to cloud 108 or server 106 to provide functionality. A zero client may depend on cloud 108 or other networks 104 or servers 106 to retrieve operating system data for the client device 102. Cloud 108 may include back end platforms, e.g., servers 106, storage, server farms or data centers.

Cloud 108 may be public, private, or hybrid. Public clouds may include public servers 106 that are maintained by third parties to clients 102 or the owners of the clients. Servers 106 may be located off-site in remote geographical locations as disclosed above or otherwise. Public clouds may be connected to servers 106 over a public network. Private clouds may include private servers 106 that are physically maintained by clients 102 or owners of clients. Private clouds may be connected to servers 106 over a private network 104. Hybrid clouds 109 may include both the private and public networks 104 and servers 106.

Cloud 108 may also include a cloud-based delivery, e.g. Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers or virtualization resources from large pools, allowing the users to quickly scale up by accessing more resources as needed. Examples of IaaS include Amazon Web Services (AWS) provided by Amazon, Inc. of Seattle, Wash., Rackspace Cloud provided by Rackspace Inc. of San Antonio, Tex., Google Compute Engine provided by Google Inc. of Mountain View, Calif., or RightScale provided by RightScale, Inc. of Santa Barbara, Calif. PaaS providers may offer functionality provided by IaaS, including, e.g., storage, networking, servers, virtualization or containerization, as well as additional resources, e.g., the operating system, middleware, or runtime resources. Examples of PaaS include Windows Azure provided by Microsoft Corporation of Redmond, Wash., Google App Engine provided by Google Inc., and Heroku provided by Heroku, Inc. of San Francisco Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, Calif., or Office365 provided by Microsoft Corporation. Examples of SaaS may also include storage providers, e.g. Dropbox provided by Dropbox Inc. of San Francisco, Calif., Microsoft OneDrive provided by Microsoft Corporation, Google Drive provided by Google Inc., or Apple iCloud provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources using web-based user interfaces, provided by a web browser (e.g. Google Chrome, Microsoft Internet Explorer, or Mozilla Firefox provided by Mozilla Foundation of Mountain View, Calif.). Clients 102 may also access SaaS resources through smartphone or tablet applications, including e.g., Salesforce Sales Cloud, or Google Drive App. Clients 102 may also access SaaS resources through the client operating system, including e.g. Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Client 102 and server 106 may be deployed as and/or executed on any type and form of computing device, e.g., a computer, network device or appliance capable of communicating on any type and form of network and performing the operations described herein.

Figure 1C:
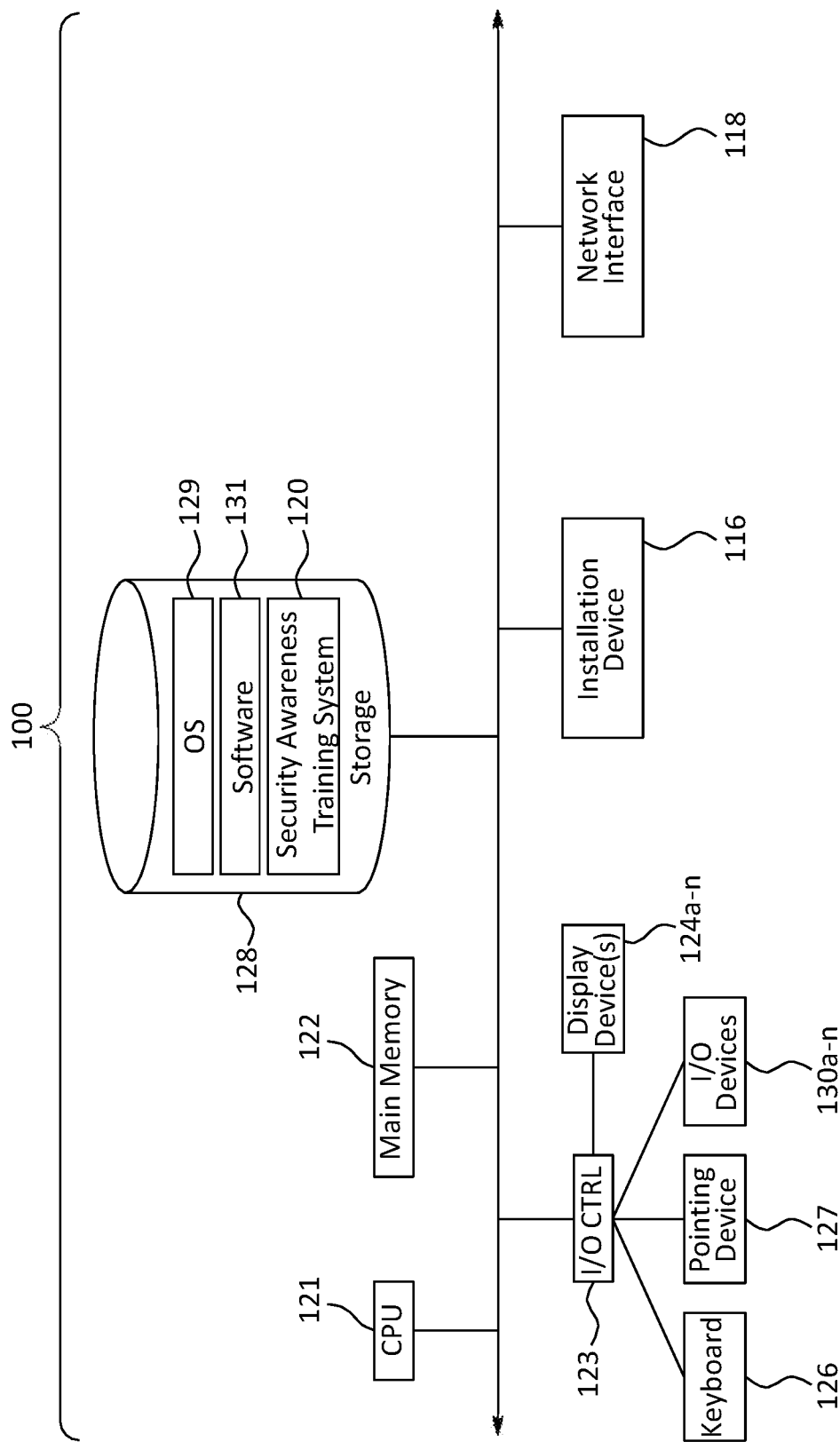
FIGS. 1C and 1D are block diagrams depicting embodiments of computing devices useful in connection with the methods and systems described herein, according to some embodiments.
Figure 1D:
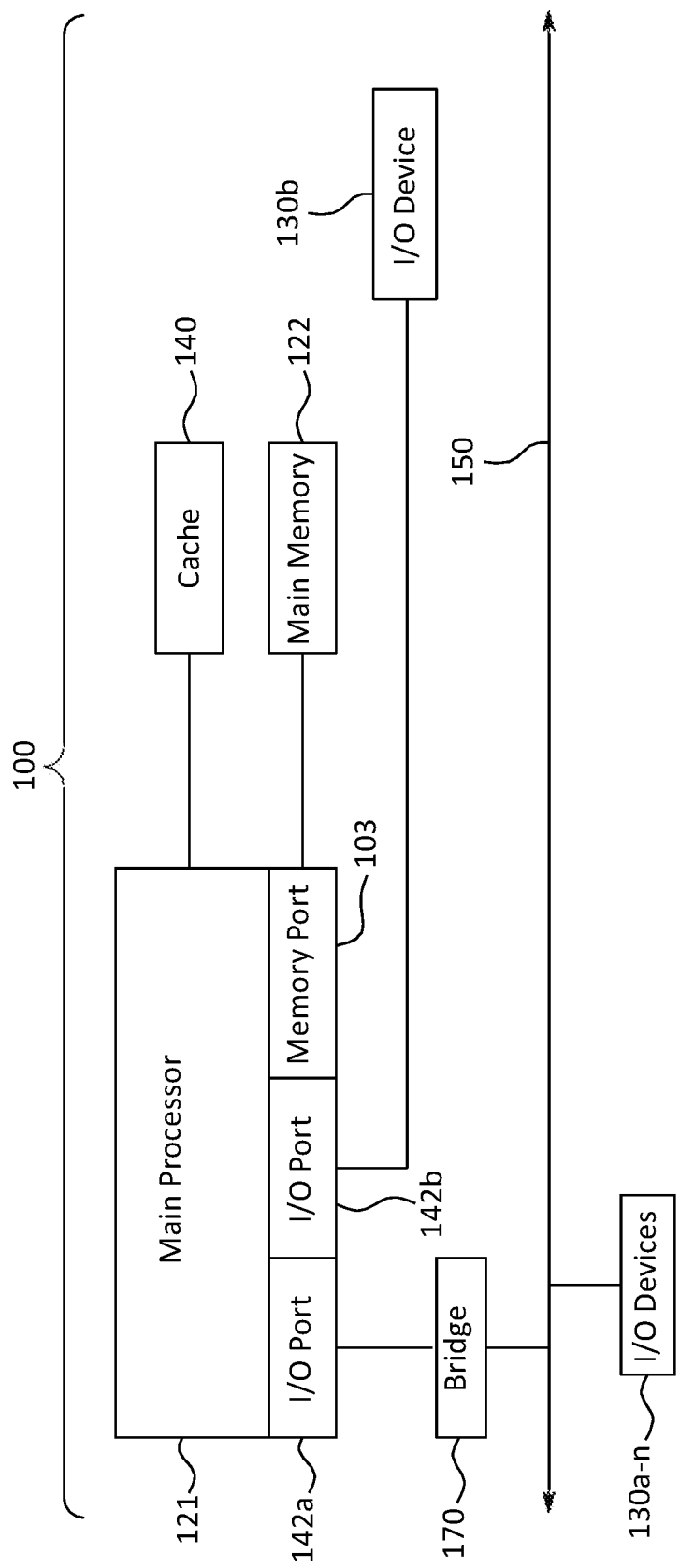

FIG. 1C and FIG. 1D depict block diagrams of a computing device 100 useful for practicing an embodiment of client 102 or server 106. As shown in FIG. 1C and FIG. 1D, each computing device 100 includes central processing unit 121, and main memory unit 122. As shown in FIG. 1C, computing device 100 may include storage device 128, installation device 116, network interface 118, and I/O controller 123, display devices 124a-124n, keyboard 126 and pointing device 127, e.g., a mouse. Storage device 128 may include, without limitation, operating system 129, software 131, and a software of security awareness training system 120. As shown in FIG. 1D, each computing device 100 may also include additional optional elements, e.g., a memory port 103, bridge 170, one or more input/output devices 130a-130n (generally referred to using reference numeral 130), and cache memory 140 in communication with central processing unit 121.

Central processing unit 121 is any logic circuitry that responds to and processes instructions fetched from main memory unit 122. In many embodiments, central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. Computing device 100 may be based on any of these processors, or any other processor capable of operating as described herein. Central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTER CORE i5 and INTEL CORE i7.

Main memory unit 122 may include one or more memory chips capable of storing data and allowing any storage location to be directly accessed by microprocessor 121. Main memory unit 122 may be volatile and faster than storage 128 memory. Main memory units 122 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, main memory 122 or storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. Main memory 122 may be based on any of the above described memory chips, or any other available memory chips capable of operating as described herein. In the embodiment shown in FIG. 1C, the processor 121 communicates with main memory 122 via system bus 150 (described in more detail below). FIG. 1D depicts an embodiment of computing device 100 in which the processor communicates directly with main memory 122 via memory port 103. For example, in FIG. 1D main memory 122 may be DRDRAM.

FIG. 1D depicts an embodiment in which the main processor 121 communicates directly with cache memory 140 via a secondary bus, sometimes referred to as a backside bus. In other embodiments, main processor 121 communicates with cache memory 140 using system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via local system bus 150. Various buses may be used to connect central processing unit 121 to any of I/O devices 130, including a PCI bus, a PCI-X bus, or a PCI-Express bus, or a NuBus. For embodiments in which the I/O device is video display 124, the processor 121 may use an Advanced Graphic Port (AGP) to communicate with display 124 or the I/O controller 123 for display 124. FIG. 1D depicts an embodiment of computer 100 in which main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WIT, Nintendo WII U GAMEPAD, or Apple iPhone. Some devices 130a-130n allow gesture recognition inputs through combining some of the inputs and outputs. Some devices 130a-130n provide for facial recognition which may be utilized as an input for different purposes including authentication and other commands. Some devices 130a-130n provide for voice recognition and inputs, including, e.g., Microsoft KINECT, SIRI for iPhone by Apple, Google Now or Google Voice Search, and Alexa by Amazon.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by I/O controller 123 as shown in FIG. 1C. The I/O controller may control one or more I/O devices, such as, e.g., keyboard 126 and pointing device 127, e.g., a mouse or optical pen. Furthermore, an I/O device may also provide storage and/or installation medium 116 for computing device 100. In still other embodiments, computing device 100 may provide USB connections (not shown) to receive handheld USB storage devices. In further embodiments, a I/O device 130 may be a bridge between the system bus 150 and an external communication bus, e.g. a USB bus, a SCSI bus, a FireWire bus, an Ethernet bus, a Gigabit Ethernet bus, a Fiber Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, computing device 100 may include or connect to multiple display devices 124a-124n, which each may be of the same or different type and/or form. As such, any of I/O devices 130a-130n and/or the I/O controller 123 may include any type and/or form of suitable hardware, software, or combination of hardware and software to support, enable or provide for the connection and use of multiple display devices 124a-124n by computing device 100. For example, computing device 100 may include any type and/or form of video adapter, video card, driver, and/or library to interface, communicate, connect or otherwise use display devices 124a-124n. In one embodiment, a video adapter may include multiple connectors to interface to multiple display devices 124a-124n. In other embodiments, computing device 100 may include multiple video adapters, with each video adapter connected to one or more of display devices 124a-124n. In some embodiments, any portion of the operating system of computing device 100 may be configured for using multiple displays 124a-124n. In other embodiments, one or more of the display devices 124a-124n may be provided by one or more other computing devices 100a or 100b connected to computing device 100, via network 104. In some embodiments, software may be designed and constructed to use another computer's display device as second display device 124a for computing device 100. For example, in one embodiment, an Apple iPad may connect to computing device 100 and use the display of the device 100 as an additional display screen that may be used as an extended desktop. One ordinarily skilled in the art will recognize and appreciate the various ways and embodiments that computing device 100 may be configured to have multiple display devices 124a-124n.

Referring again to FIG. 1C, computing device 100 may comprise storage device 128 (e.g. one or more hard disk drives or redundant arrays of independent disks) for storing an operating system or other related software, and for storing application software programs such as any program related to security awareness training system 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to computing device 100 via bus 150. Some storage device 128 may be external and connect to computing device 100 via a I/O device 130 that provides an external bus. Some storage device 128 may connect to computing device 100 via network interface 118 over network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Computing device 100 (e.g., client device 102) may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on client device 102. An application distribution platform may include a repository of applications on server 106 or cloud 108, which clients 102a-102n may access over a network 104. An application distribution platform may include application developed and provided by various developers. A user of client device 102 may select, purchase and/or download an application via the application distribution platform.

Furthermore, computing device 100 may include a network interface 118 to interface to network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one embodiment, computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. Network interface 118 may comprise a built-in network adapter, network interface card, PCMCIA network card, EXPRESSCARD network card, card bus network adapter, wireless network adapter, USB network adapter, modem or any other device suitable for interfacing computing device 100 to any type of network capable of communication and performing the operations described herein.

Computing device 100 of the sort depicted in FIG. 1B and FIG. 1C may operate under the control of an operating system, which controls scheduling of tasks and access to system resources. Computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Wash.; MAC OS and iOS, manufactured by Apple, Inc.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

Computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. Computer system 100 has sufficient processor power and memory capacity to perform the operations described herein. In some embodiments, computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, computing device 100 is a gaming system. For example, the computer system 100 may comprise a PLAYSTATION 3, or PERSONAL PLAYSTATION PORTABLE (PSP), PLAYSTATION VITA, PLAYSTATION 4, or a PLAYSTATION 4 PRO device manufactured by the Sony Corporation of Tokyo, Japan, or a NINTENDO DS, NINTENDO 3DS, NINTENDO WII, NINTENDO WII U, or a NINTENDO SWITCH device manufactured by Nintendo Co., Ltd., of Kyoto, Japan, or an XBOX 360 device manufactured by Microsoft Corporation.

In some embodiments, computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, computing device 100 is a tablet e.g. the IPAD line of devices by Apple; GALAXY TAB family of devices by Samsung; or KINDLE FIRE, by Amazon.com, Inc. of Seattle, Wash. In other embodiments, computing device 100 is an eBook reader, e.g. the KINDLE family of devices by Amazon.com, or NOOK family of devices by Barnes & Noble, Inc. of New York City, N.Y.

In some embodiments, communications device 102 includes a combination of devices, e.g. a smartphone combined with a digital audio player or portable media player. For example, one of these embodiments is a smartphone, e.g. the iPhone family of smartphones manufactured by Apple, Inc.; a Samsung GALAXY family of smartphones manufactured by Samsung, Inc; or a Motorola DROID family of smartphones. In yet another embodiment, communications device 102 is a laptop or desktop computer equipped with a web browser and a microphone and speaker system, e.g. a telephony headset. In these embodiments, communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, the information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Delivering Simulated Phishing Communications

The following describes systems and methods for delivering simulated phishing campaigns. Simulated phishing campaigns may comprise of one or more simulated phishing communications. Simulated phishing campaigns may also be referred to interchangeably as simulated phishing attacks. In particular, the systems and methods relate to delivering simulated phishing communications to a user's mailbox without being blocked, interacted with, and/or modified by a security system of an email system.

In some embodiments, the simulated phishing communications may be in the form of an electronic message such as an electronic mail (or email). The protocol used to send the email is Standard Mail Transfer Protocol (SMTP). The SMTP protocol is also used to send emails in the context of the simulated phishing communications. An email platform may be configured to enable sending, receiving and composing emails, and may have email addresses issued to users to utilize these functions. The simulated phishing communications in the form of emails are sent to the mailbox of email accounts associated with the one or more users. The email platform may include an email security system having one or more features to stop malicious messages (such as phishing attacks) from reaching the mailbox of the users.

When a simulated phishing campaign is delivered via an email, the email security system may categorize one or more simulated phishing communications in the simulated phishing campaign as malicious. In one example, the email security system may modify the one or more simulated phishing communications or may block its delivery to the user's mailbox. In one example, the email security system may modify the one or more simulated phishing communications or may remove it from the user's mailbox after delivery.

The systems and methods of the present disclosure leverage a security awareness training system which ensures that a simulated phishing campaign is successfully delivered to one or more users. When the simulated phishing campaign is configured, the security awareness training system includes content and communications in the simulated phishing campaign that can be successfully delivered to the one or more users without being blocked/modified by the email security system. In some embodiments, content and communications to be included in a simulated phishing campaign is adapted based upon knowledge of how the simulated phishing campaign is delivered to mailbox of email accounts associated with the one or more users.

In some embodiments, a system administrator may configure or design the simulated phishing campaign. The system administrator may refer to a professional overseeing the security awareness training system by managing design and/or configuration of simulated phishing campaigns, managing whitelisting of domains and senders, managing delivery verification campaigns, and managing any other task within the security awareness training system. The system administrator may configure a delivery verification campaign whereby the security awareness training system sends simulated phishing communications to one or more test accounts in order to determine whether the email security system intercepts, interacts with, or otherwise modifies the simulated phishing communications of the delivery verification campaign. The test accounts may correspond to email accounts accessible by the security awareness training system or the system administrator and may not be associated with real users although they may incorporate a domain name associated with an organization or any group of users. The email security system may respond to emails sent to the test accounts in the same way as it responds to emails sent to one or more users. Whether or not the simulated phishing communications of the delivery verification campaign are allowed to pass by the email security system and arrive in mailbox of the one or more test accounts demonstrates whether some or all of the simulated phishing communications sent to the users will be blocked by the email security system. Further, the security awareness training system and/or the system administrator may access the test accounts to check if the delivered simulated phishing communications have been interacted with or modified by the email security system. With the knowledge of which simulated phishing communications can be reliably delivered (i.e. without being blocked, interacted with, and/or modified by the email security system) to the mailbox of one or more users in an organization, the security awareness training system can adapt the range of options (for example, phishing communication templates, type of phishing attacks, and type of attachments for the simulated phishing communications) that are presented to the system administrator for selection when the system administrator configures or designs the simulated phishing campaign. In an embodiment, the security awareness training system may choose from the range of options when the simulated phishing campaign is configured by the security awareness training system.

In some embodiments, the security awareness training system may execute the simulated phishing campaign designed using the range of options selected by the system administrator. In another embodiment, the security awareness training system may execute the simulated phishing campaign using a direct-injection mechanism where the simulated phishing campaign is injected into the mailbox of the user via an Application Programming Interface (API). The email platform may provide the API which allows authorized access to a user's mailbox. The simulated phishing campaign delivered using the direct-injection mechanism may bypass the email security system, and therefore, simulation phishing communications are guaranteed to appear in the user's mailbox. The simulated phishing campaign may, for example, target a single user or a group of users, such as employees of an organization, for imparting cybersecurity awareness. The simulated phishing campaign may be carried out for specific purposes including identifying security awareness levels of users, updating risk scores of the users, and giving training to more vulnerable groups or users in the organization.

Figure 2:
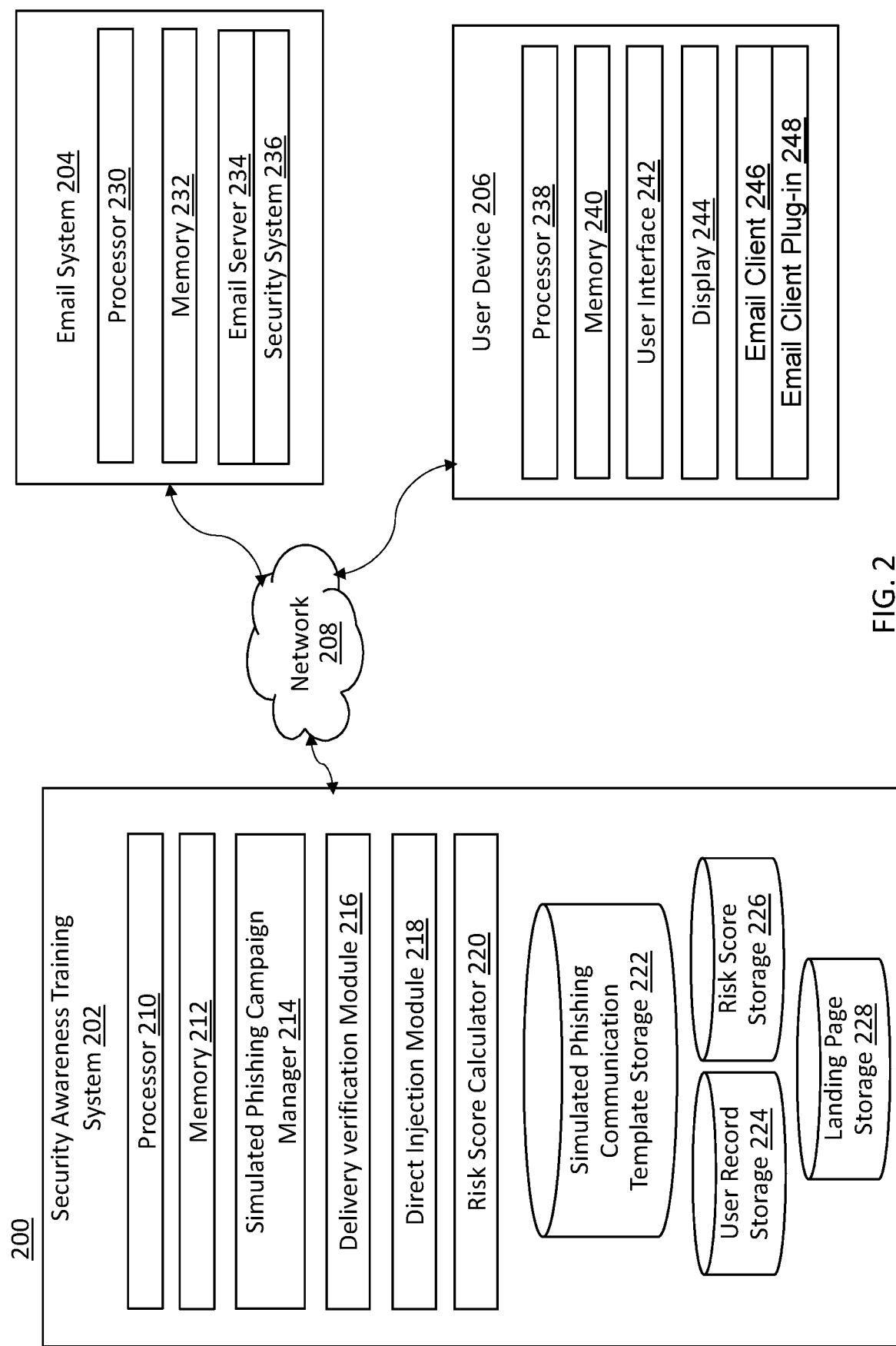
FIG. 2 depicts an implementation of some of the architecture of an implementation of a system for delivering simulated phishing communications, according to some embodiments.

FIG. 2 depicts an implementation of some of an architecture of system 200 for delivering simulated phishing communications to the mailboxes of one or more users without being blocked, modified, and/or interacted with in an email system, according to some embodiments.

System 200 may include security awareness training system 202, email system 204, user device 206, and network 208 enabling communication between the system components. Network 208 may be an example or instance of network 104, the details of which are provided with reference to FIG. 1A and its accompanying description.

Security awareness training system 202 may configure and design simulated phishing campaigns, manage delivery verification campaigns, send the simulated phishing campaigns to one or more users, assess cybersecurity risk associated with the one or more users, manage cybersecurity training for the one or more users, and manage any other function associated with security awareness training system 202. In some implementations, security awareness training system 202 may be owned or managed or otherwise associated with an organization or any entity authorized thereof. A system administrator may be a professional managing organizational cybersecurity aspects. The system administrator may oversee and manage security awareness training system 202 to ensure cybersecurity goals of the organization are met. In an embodiment, the system administrator may be assigned login credentials to access security awareness training system 202.

Security awareness training system 202 may communicate a simulated phishing campaign using the organization's domain. In some implementations, security awareness training system 202 may register additional domains that are doppelganger (or "look-a-like") domains (i.e. domains that closely resemble real and known domains but are slightly different) to be used as part of the simulated phishing campaign. These domains may appear relevant to the subject matter of the simulated phishing campaign but in reality, would be used for websites that exist only as a part of the simulated phishing campaign. Security awareness training system 202 may use the doppelganger domains to increase apparent realism of a message by making the simulated phishing communication appear to have originated from a real and a known domain. In an implementation, security awareness training system 202 may operate in close coordination with email system 204 such that security awareness training system 202 may intercept emails sent out by email system 204 before the emails are delivered to intended recipients. In some implementations, contexts extracted from the intercepted emails may be used to develop simulated phishing communications.

Security awareness training system 202 may be implemented in a variety of computing systems, such as a mainframe computer, a server, a network server, a laptop computer, a desktop computer, a notebook, a workstation, and any other computing system. In an implementation, security awareness training system 202 may be communicatively coupled with email system 204 and user device 206 through network 208 for exchanging information. In an implementation, security awareness training system 202 may be implemented in a server, such as server 106 shown in FIG. 1A. In some implementations, security awareness training system 202 may be implemented by a device, such as computing device 100 shown in FIG. 1C and FIG. 1D. In some embodiments, security awareness training system 202 may be implemented as a part of a cluster of servers. In some embodiments, security awareness training system 202 may be implemented across a plurality of servers, thereby tasks performed by security awareness training system 202 may be performed by the plurality of servers. These tasks may be allocated among the cluster of servers by an application, a service, a daemon, a routine, or other executable logic for task allocation.

In one or more embodiments, security awareness training system 202 may facilitate cybersecurity awareness training via simulated phishing attacks. A simulated phishing attack is a technique of testing a user to see whether the user is likely to recognize a true malicious phishing attack and act appropriately upon receiving the malicious phishing attack. The simulated phishing attack may include simulated phishing communications that may include links, attachments, macros, or any other simulated phishing threat that resembles a real phishing threat. In response to a user interaction with the simulated phishing communication, for example if the user clicks on a link (i.e., a simulated phishing link), the user may be provided with security awareness training. In an example, security awareness training system 202 may be a Computer Based Security Awareness Training (CBSAT) system that performs security services such as performing simulated phishing attacks on a user or a set of users of the organization as a part of security awareness training. In some embodiments, the user may be an employee of the organization, a customer, or a vendor. In some embodiments, the user may be an end-customer, consumer or a patron using goods and/or services of the organization. According to some embodiments, security awareness training system 202 may include processor 210 and memory 212. For example, processor 210 and memory 212 of security awareness training system 202 may be CPU 121 and main memory 122 respectively as shown in FIG. 1C and FIG. 1D. Further, security awareness training system 202 may include simulated phishing campaign manager 214. Simulated phishing campaign manager 214 may include various functionalities that may be associated with cybersecurity awareness training. In an implementation, simulated phishing campaign manager 214 may be an application or a program that manages various aspects of a simulated phishing attack, for example, tailoring and/or executing a simulated phishing attack. A simulated phishing attack may test the readiness of a user to handle phishing attacks such that malicious actions are prevented. For instance, simulated phishing campaign manager 214 may monitor and control timing of various aspects of a simulated phishing attack including processing requests for access to attack results, and performing other tasks related to the management of a simulated phishing attack.

In some embodiments, simulated phishing campaign manager 214 may generate simulated phishing messages. The messages generated by simulated phishing campaign manager 214 may be of any appropriate format. For example, the messages may be email messages, text messages, short message service (SMS) messages, instant messaging (IM) messages used by messaging applications such as, e.g., WhatsApp™, or any other type of message. Message type to be used in a particular simulated phishing communication may be determined by, for example, simulated phishing campaign manager 214. The messages may be generated in any appropriate manner, e.g. by running an instance of an application that generates the desired message type, such as a Gmail® application, a Microsoft Outlook™ application, a WhatsApp™ application, a text messaging application, or any other appropriate application. In an example, simulated phishing campaign manager 214 may generate simulated phishing communications in a format consistent with specific messaging platforms, for example Outlook 365™, Outlook® Web Access (OWA), Webmail™, iOS®, Gmail®, and any other messaging platforms. The simulated phishing communications may be used in simulated phishing attacks or in simulated phishing campaigns.

Security awareness training system 202 may include delivery verification module 216 and direct injection module 218. In an implementation, simulated phishing campaign manager 214, delivery verification module 216, and direct injection module 218, may be coupled to processor 210 and memory 212. In some embodiments, simulated phishing campaign manager 214, delivery verification module 216, and direct injection module 218, amongst other modules, may include routines, programs, objects, components, and data structures which may perform particular tasks or implement particular abstract data types. Simulated phishing campaign manager 214, delivery verification module 216 and direct injection module 218, may also be implemented as, signal processor(s), state machine(s), logic circuitries, and/or any other device or component that manipulates signals based on operational instructions.

In some embodiments, simulated phishing campaign manager 214, delivery verification module 216, and direct injection module 218 may be implemented in hardware, instructions executed by a processing unit, or by a combination thereof. The processing unit may comprise a computer, a processor, a state machine, a logic array or any other suitable devices capable of processing instructions. The processing unit may be a general-purpose processor which executes instructions to cause the general-purpose processor to perform the required tasks or, the processing unit may be dedicated to perform the required functions. In some embodiments, simulated phishing campaign manager 214, delivery verification module 216, and direct injection module 218 may be machine-readable instructions which, when executed by a processor/processing unit, perform any desired functionalities. The machine-readable instructions may be stored on an electronic memory device, hard disk, optical disk or other machine-readable storage medium or non-transitory medium. In an implementation, the machine-readable instructions may also be downloaded to the storage medium via a network connection. In an example, machine-readable instructions may be stored in processor 210.

In an implementation, simulated phishing campaign manager 214 may be configured to design or configure a simulated phishing campaign to test if users are likely to recognize a true malicious phishing attack and act appropriately upon receiving one. The simulated phishing campaign may include one or more simulated phishing communications to be sent to one or more users. In an embodiment, the one or more simulated phishing communications are sent to the mailbox of email accounts associated with the one or more users. Simulated phishing campaign manager 214 may be configured to log how the one or more users interacted with the simulated phishing communications and determine a risk score for each of the one or more users, a team of users, a company, or any other group of users. In an embodiment, simulated phishing campaign manager 214 may be configured to present a cybersecurity training assignment to users who interacted with the one or more simulated phishing communications. In an embodiment, simulated phishing campaign manager 214 may present a range of options (for example, simulated phishing communication templates, types of simulated phishing attacks, types of attachments, and other options for the simulated phishing communications) to the system administrator for selection when the system administrator configures or designs a simulated phishing campaign. In an embodiment, simulated phishing campaign manager 218 may choose from the range of options to design or configure the simulated phishing campaign.

In an implementation, delivery verification module 216 may be configured to send one or more simulated phishing communications to one or more test accounts. In an embodiment, the test accounts may correspond to email accounts that may not be associated with real users although they may incorporate a domain name associated with an organization or a group of users. The simulated phishing communications sent to the test accounts may be allowed to pass by security system 236 in the same way as they would if they were addressed to users of the organization or a group of users. Delivery verification module 216 may have access to the test accounts. Delivery verification module 216 may be configured to access the mailbox of the test accounts to determine whether security system 236 blocked, modified, and/or interacted with the simulated phishing communications. Delivery verification module 216 may be configured to access the mailbox of the test accounts to determine whether security system 236 allowed the simulated phishing communications to pass to the test accounts in the same form as they were sent. By accessing the mailbox of the test accounts, delivery verification module 216 may determine which types of simulated phishing communications can be sent reliably, i.e. without being intercepted, modified, and/or interacted with by security system 236 to user email accounts having same domain as the test accounts. In an embodiment, delivery verification module 216 may be configured to share which simulated phishing communications were sent reliably with simulated phishing campaign manager 214. Simulated phishing campaign manager 214 may adapt the range of options for designing or configuring the simulated phishing campaign based upon which simulated phishing communication could be sent reliably.

In an implementation, direct injection module 218 may be configured to deliver simulated phishing communications directly to a user's mailbox. In an embodiment, direct injection module 218 may gain access to email system 204 (or a messaging platform of an organization) in order to access the user's mailbox and directly inject simulated phishing communications in the user's mailbox. In an embodiment, direct injection module 218 may inject the simulated phishing communications in the user's mailbox via an Application Programming Interface (API) associated with email system 204 (or the messaging platform of an organization). In an embodiment, by directly injecting the simulated phishing communications in the user's mailbox, the simulated phishing communications may bypass security system 240 and are guaranteed to appear in the user's mailbox without being blocked, interacted with, and/or modified by security system 240.

Referring again to FIG. 2, in some embodiments, security awareness training system 202 may include risk score calculator 220. Risk score calculator 220 may be an application or a program for determining and maintaining risk scores for users of an organization. A risk score of a user may be a representation of vulnerability of the user to a malicious attack. In an implementation, risk score calculator 220 may maintain more than one risk score for each user. Each risk score may represent the vulnerability of the user to a specific cyberattack. In an implementation, risk score calculator 220 may calculate risk scores for a group of users, the organization, an industry to which the organization belongs, a geography, or any other set or subset of users. In an example, a risk score of a user may be modified based on the user's responses to simulated phishing communications, completion of training by the user, a current position of the user in the organization, a size of a network of the user, an amount of time the user has held the current position in the organization, and/or any other attribute that can be associated with the user.

In some embodiments, security awareness training system 202 may include simulated phishing communication template storage 222, user record storage 224, risk score storage 226, and landing page storage 228. In an implementation, simulated phishing communication template storage 222 may store simulated phishing communication templates, hyperlinks, attachment files, types of simulated cyberattacks, exploits, one or more categories of simulated phishing communications content, and any other content designed to test security awareness of users. User record storage 224 may store user information and one or more contextual parameters associated with each user of an organization. In some examples, the contextual parameters may be derived from a user's device settings, or through synchronization with an Active Directory or other repository of user data. A contextual parameter for a user may include information associated with the user that may be used to make a simulated phishing communication more relevant to that user. In an example, one or more contextual parameters for a user may include one or more of the following—language spoken by the user, locale of the user, temporal changes (for example, time at which the user changes their locale), job title of the user, job department of the user, religious beliefs of the user, topic of communication, subject of communication, name of manager or subordinate of the user, industry, address (for example, Zip Code and street), name or nickname of the user, subscriptions, preferences, recent browsing history, transaction history, recent communications with peers/managers/human resource partners/banking partners, regional currency and units, and any other information associated with the user.

In examples, risk score storage 226 may store risk scores of users, risk scores of individual users, combined risk score of a group of users (such as a team within an organization), or risk scores of a company. In an embodiment, the risk score of a company may correspond to combined risk score of all the users of an organization.

Landing page storage 228 may store landing page templates. In an example, a landing page may be a webpage or an element of a webpage that appears in response to a user interaction such as clicking on a link or downloading an attachment) to provision training materials. The simulated phishing communication templates stored in simulated phishing communication template storage 222, the user information and the one or more contextual parameters for the users stored in user record storage 224, the risk scores of the users stored in risk score storage 226, and the landing page templates stored in landing page storage 228 may be periodically or dynamically updated as required.

According to an embodiment, email system 204 may be any email handling system owned or managed or otherwise associated with an organization or any entity authorized thereof. Email system 204 may be implemented in a variety of computing systems, such as a mainframe computer, a server, a network server, a laptop computer, a desktop computer, a notebook, a workstation, and any other computing system. In an implementation, email system 204 may be communicatively coupled with security awareness training system 202 and user device 206 through network 208 for exchanging information. In an implementation, email system 204 may be implemented in a server, such as server 106 shown in FIG. 1A. In another implementation, email system 204 may be implemented by a device, such as computing device 100 shown in FIG. 1C and FIG. 1D. In an implementation, email system 204 may be configured to receive, send, and/or relay outgoing emails (for example, simulated phishing communications) between message senders (for example, security awareness training system 202) and recipients (for example, user device 206).

Email system 204 may include processor 230, memory 232, email server 234, and security system 236. For example, processor 230 and memory 232 of email system 204 may be CPU 121 and main memory 122, respectively, as shown in FIG. 1C and FIG. 1D. In an implementation, email server 234 may be any server capable of handling, receiving and delivering emails over network 208 using one or more standard email protocols, such as Post Office Protocol 3 (POP3), Internet Message Access Protocol (IMAP), Simple Message Transfer Protocol (SMTP), and Multipurpose Internet Mail Extension (MIME) Protocol. Email server 234 may be a standalone server or a part of an organization's server. Email server 234 may be implemented using, for example, Microsoft® Exchange Server, and HCL Domino®. In an implementation, email server 234 may be a server 106 shown in FIG. 1A. Email server 234 may be implemented by a device, such as computing device 100 shown in FIG. 1C and FIG. 1D. Alternatively, email server 234 may be implemented as a part of a cluster of servers. In some embodiments, email server 234 may be implemented across a plurality of servers, thereby, tasks performed by email server 234 may be performed by the plurality of servers. These tasks may be allocated among the cluster of servers by an application, a service, a daemon, a routine, or other executable logic for task allocation. In an implementation, user device 206 may receive simulated phishing communications through email server 234 of email system 204.

Security system 236 may be a service, application daemon, a routine, or other executable logic that include instructions or a set of rules to secure access and/or content of emails sent to users and to stop malicious messages (such as phishing attacks) from reaching mailboxes of the users. Security system 236 may be implemented in hardware, instructions executed by processor 230, or by a combination thereof. In some embodiments, security system 236 may be machine-readable instructions which, when executed by processor 230, perform any of the desired functionalities.

In some embodiments, user device 206 may be any device used by a user. The user may be an employee of an organization or any entity. User device 206 as disclosed, may be any computing device, such as a desktop computer, a laptop, a tablet computer, a mobile device, a Personal Digital Assistant (PDA) or any other computing device. In an implementation, user device 206 may be a device, such as client device 102 shown in FIG. 1A and FIG. 1B. User device 206 may be implemented by a device, such as computing device 100 shown in FIG. 1C and FIG. 1D.

According to some embodiment, user device 206 may include processor 238 and memory 240. In an example, processor 238 and memory 240 of user device 206 may be CPU 121 and main memory 122, respectively, as shown in FIG. 1C and FIG. 1D. User device 206 may also include user interface 242 such as a keyboard, a mouse, a touch screen, a haptic sensor, voice-based input unit, or any other appropriate user interface. It shall be appreciated that such components of user device 206 may correspond to similar components of computing device 100 in FIG. 1C and FIG. 1D, such as keyboard 126, pointing device 127, I/O devices 130a-n and display devices 124a-n. User device 206 may also include display 244, such as a screen, a monitor connected to the device in any manner, or any other appropriate display. In an implementation, user device 206 may display a received message (such as a simulated phishing communication) for the user using display 244 and is able to accept user interaction via user interface 242 responsive to the displayed message.

Referring again to FIG. 2, in some embodiments, user device 206 may include email client 246. In one example implementation, email client 246 may be an application installed on user device 206. In some example implementations, email client 246 may be an application that can be accessed over network 208 through a browser without requiring any installation on user device 206. In an implementation, email client 246 may be any application capable of composing, sending, receiving, and reading emails. For example, email client 246 may be an instance of an application, such as Microsoft Outlook™ application, Lotus Notes® application, Apple Mail® application, Gmail® application, or any other known or custom email application. In an example, a user of user device 206 may select, purchase and/or download Email client 246, through for example, an application distribution platform. Note that as used herein, the term "application" may refer to one or more applications, services, routines, or other executable logic or instructions.

Email client 246 may include email client plug-in 248. In some implementations, Email client plug-in 248 may not be implemented in email client 246 but may coordinate and communicate with email client 246. Further, in an implementation, email client 246 may communicate with email client plug-in 248 over network 208. In some implementations, email client plug-in 248 is an interface local to email client 246 that enables email client users, i.e., recipients of emails, to report suspicious emails that they believe may be a threat to them or their organization. Email client plug-in 248 may be an application or program that may be added to email client 246 for providing one or more additional features which enable customization. Email client plug-in 248 may be provided by the same entity that provides the email client software or may be provided by a different entity. In an example, email client 246 may include plug-ins providing a User Interface (UI) element such as a button to trigger a function. Functionality of email client plug-ins that use a UI button may be triggered when a user clicks the button. Some of the examples of email client plug-ins that use a button UI include but are not limited to, a Phish Alert Button (PAB) plug-in, a task create plug-in, a spam marking plug-in, an instant message plug-in and a search and highlight plug-in.

Referring back to FIG. 2, email client plug-in 248 may provide the button plug-in through which function or capabilities of email client plug-in 248 is triggered by a user action on the button. Upon activation, email client plug-in 248 may forward the email to a security contact point. Other implementations of email client plug-in 248 not discussed here are contemplated herein.

In operation, security awareness training system 202 may initiate simulated phishing campaigns periodically or dynamically as a part of security awareness training in an organization to educate the users on how to spot and report a suspected phishing attack. In an embodiment, simulated phishing campaigns may include simulated phishing communications that include or mimic tricks that real phishing messages use, to teach the users to recognize the real phishing attacks. In an embodiment, a simulated phishing communication may refer to any communication that is sent to a user with the intent of training the user to recognize phishing attacks that would cause the user to reveal confidential information, or otherwise compromise the security of the organization. The simulated phishing communications may be emails, SMS messages, IM messages, voice messages or any other electronic method of communication or messaging. The more genuine a simulated phishing communication looks, the more likely the user may respond to the simulated phishing communication.

Various protocols may be used to deliver an electronic message to a user depending on type of the electronic message. In an example, for email messages having simulated phishing communications, one or more standard email protocols, such as POP3, IMAP, SMTP, and MIME Protocol may be used to deliver an email to a mailbox of a user. Similar protocols may be used to send an email in the context of a simulated phishing communication. When security awareness training system 202 sends one or more simulated phishing communications to user device 206, security system 236 may scan the one or more simulated phishing communications to determine if the simulated phishing communications are malicious or to detect any presence of malicious elements such as attachments, links, code, executable files, or any other elements in the simulated phishing communications. In instances where security system 236 finds the simulated phishing communication as malicious or containing any malicious elements, security system 236 may categorize the simulated phishing communications as malicious. Consequently, security system 236 may block the simulated phishing communications categorized as malicious. In some implementations, security system 236 may modify and/or interact with the blocked simulated phishing communications in a secure environment (for example, sandbox) to determine if the simulated phishing communications are harmful. In other examples, where security system 236 determines that the simulated phishing communications are not malicious or does not detect any presence of malicious elements in the simulated phishing communications, security system 236 may allow email system 204 to deliver the simulated phishing communications. In implementations, where security system 236 blocks simulated phishing communications, security awareness training system 202 may not be able to train the users on phishing attacks effectively. Also, the system administrator may find it tedious and time-consuming to identify the simulated phishing communications that have passed through security system 236 and are delivered to the user.

To ensure effective training of the users on phishing attacks, delivery of the simulated phishing communications to the users may be desirable. In one or more embodiments, to ensure delivery of the simulated phishing communications to the users, the system administrator may adopt a process of whitelisting, where a list of domain names and/or email senders (for example, security awareness training system 202) are submitted to security system 236 to "whitelist" or trust that the simulated phishing communications from the list of domain names and/or email senders are legitimate and safe. Once the list of domain names and/or email senders are whitelisted, security system 236 may allow the simulated phishing communications from security awareness training system 202 to be delivered to the users. However, with introduction of new and/or more robust features to security system 236, for example, with the introduction of new methods of detecting malicious emails, the whitelisting may be rendered ineffective. As a result, a need may be created for regular updating of the whitelisting. Regular updating may be onerous and require a lot of time from the system administrator and may add to the existing workload of the system administrator. Additionally, some simulated phishing communications may be stopped by security system 236 before the system administrator recognizes that the whitelisting is no longer effective, leading to development of a skewed perception of a user's security awareness as previously described.

In one or more embodiments, to overcome the challenges posed by enhancements and changes to security system 236 leading to ineffective whitelisting, security awareness training system 202 may utilize a technique of direct injection to place simulated phishing communications in the users' inbox. Security awareness training system 202 may utilize direct injection module 218 to perform direct injection to place simulated phishing communications in the users' inbox without having to be passed or allowed by security system 236. In one or more embodiments, direct injection module 218 may directly inject the one or more simulated phishing communications into the mailbox of the user. Using the API associated with email system 204, direct injection module 218 may gain access to email server 234 to access the user's mailbox. Directly injecting one or more simulated phishing communications in the user's mailbox causes the one or more simulated phishing communications to bypass security system 236. Thus, the one or more simulated phishing communications may be sent to the user without being blocked, modified, and/or interacted with by security system 236.

Direct injection of simulated phishing communications may reduce or remove the overhead of the whitelisting process as the simulated phishing communications may not have to be passed or allowed by security system 236. Configuring security system 236 to trust emails from whitelisted domains and/or whitelisted senders may not be required as the simulated phishing communications can be directly placed in the mailbox of the user bypassing security system 236. Further, introduction of new and/or more robust features to security system 236 may render whitelisting ineffective and may require regular updating of the whitelisting. In an implementation, direct injection of simulated phishing communications may be an efficient way of delivering the simulated phishing communications to the users with certainty. Most email platforms provide an API that allows authorized access to messages in a user's mailbox. Examples of these are the Graph API for Microsoft Exchange Online® and the Gmail® API for Google's G-Suite®. In an example, direct injection module 218 may place a simulated phishing communication into the user's mailbox when using the Graph API for Microsoft Exchange Online®, using the POST method with the message specified in the JavaScript Object Notation (JSON) format. An example direct injection of a simulated phishing communication into the user's mailbox using the Graph API for Microsoft Exchange Online®, using the POST method with the message specified in the JavaScript Object Notation (JSON) format is provided below.

```
func InjectMessage(
    ctx context.Context,
    tenantToken *oauth2.Token,
    targetAddress string,
    message [ ]byte,
) ([ ]byte, error) {
    body := fmt.Sprintf(
        `<?xml version="1.0" encoding="utf-8"?>
<s:Envelope xmlns:s="http://schemas.xmlsoap.org/soap/envelope/">
    <s:Header>
        <Action s:mustUnderstand="1"
xmlns="http://schemas.microsoft.com/ws/2005/05/addressing/none">http://schemas.micro-
soft.com/exchange/services/2006/messages/CreateItem</Action>
        <h:ExchangeImpersonation
xmlns="http://schemas.microsoft.com/exchange/services/2006/types"
xmlns:xsi="http://www.w3.org/2001/XMLSchema-instance"
xmlns:xsd="http://www.w3.org/2001/XMLSchema"
xmlns:h="http://schemas.microsoft.com/exchange/services/2006/types">
            <ConnectingSID>
                <SmtpAddress>%s</SmtpAddress>
            </ConnectingSID>
        </h:ExchangeImpersonation>
        <h:RequestServerVersion Version="Exchange2016"
xmlns="http://schemas.microsoft.com/exchange/services/2006/types"
xmlns:h="http://schemas.microsoft.com/exchange/services/2006/types"/>
    </s:Header>
    <s:Body xmlns:xsi="http://www.w3.org/2001/XMLSchema-
instance" xmlns:xsd="http://www.w3.org/2001/XMLSchema">
        <CreateItem MessageDisposition="SaveOnly"
SendMeetingInvitations="SendToNone"
xmlns="http://schemas.microsoft.com/exchange/services/2006/messages">
            <SavedItemFolderId>
                <DistinguishedFolderId Id="inbox"
xmlns="http://schemas.microsoft.com/exchange/services/2006/types"/>
            </SavedItemFolderId>
            <Items>
                <Message
xmlns="http://schemas.microsoft.com/exchange/services/2006/types">
                    <MimeContent CharacterSet="utf-8">%s</MimeContent>
                    <ExtendedProperty>
                        <ExtendedFieldURI PropertyTag="3591" PropertyType="Integer"/>
                        <Value>0</Value>
                    </ExtendedProperty>
                </Message>
            </Items>
        </CreateItem>
    </s:Body>
</s:Envelope>`,
        targetAddress,
        base64.StdEncoding.EncodeToString(message),
    )
    req, err :=
        http.NewRequestWithContext(
            ctx,
            http.MethodPost,
            "https://outlook.office365.com/EWS/Exchange.asmx",
            strings.NewReader(body),
        )
    if err != nil {
        return nil,
        err
    }
    tenantToken.SetAuthHeader(req)
    req.Header.Set("X-AnchorMailbox",
    targetAddress) req.Header.Set("Content-Type",
    "text/xml")
    resp, err := http.DefaultClient.Do(req)
    if err != nil {
        return nil, err
    }
    if resp.StatusCode != http.StatusOK {
        return nil, errors.New("failed to inject email")
```

```
    }
    respBody, err :=
    ioutil.ReadAll(resp.Body) if err != nil {
        return nil, err
    }
    return respBody, nil
}
```

In another example, direct injection module 218 may place a simulated phishing communication into the user's mailbox when using the Gmail® API for Google's G-Suite®, using an "insert" method. An example of the insert method in a Java code provided by Google is shown below:

```
/**
 *Insert an email message into the user's mailbox.
 *
 * @param service Authorized Gmail API instance.
 * @param userId User's email address. The special value "me"
 * can be used to indicate the authenticated user.
 * @param email email to be inserted.
 * @throws MessagingException
 * @throws IOException
 */
public static Message insertMessage(Gmail service, String userId,
MimeMessage email)
    throws MessagingException, IOException {
  Message message = createMessageWithEmail(email);
  message = service.users( ).messages( ).insert(userId,
message).execute( );
  System.out.println("Message id: " + message.getId( ));
  System.out.println(message.toPrettyString( ));
  return message;
}
```

Although the above code is in Java, in some embodiments, direct injection module 218 may directly inject the simulated phishing communications into a user's mailbox using .NET, PHP, Python, JavaScript, or any other programming languages or frameworks.

Direct injection of simulated phishing communications into the user's mailbox may provide new opportunities to train users to recognize the risks arising from real phishing. In one example, simulated phishing communications that appear to be addressed to other users, but which have not actually been sent to them may be directly injected into a user's mailbox. The presence of addresses of other recipients, such as the user's manager or other senior persons in an organization may cause a user to believe that a message is genuine and not a simulated phishing communication. In another example, emails corresponding to simulated phishing communications may be directly injected into the user's mailbox with earlier timestamps. Presence of simulated phishing communications with earlier timestamps may cause the user to believe that such emails have been in the mailbox for longer than they actually have been. The example is particularly relevant where the user's email client 250 may take into account the time and date information from the email header when organizing and presenting messages to the user, such that the directly injected email (comprising the simulated phishing communication) appears some way down from the latest message in the user's mailbox. Such placement of directly injected email may create a sense of urgency in the user who may believe that they are late in responding to a message and the user may therefore be more likely to interact with such emails.

In another example, a first simulated phishing communication with time and date information may be directly injected into the user's mailbox together with a second simulated phishing communication with a follow-on message (for example, "I sent you the details a week ago . . . ") referring to the first simulated phishing communication. Although injected at the same time, the first simulated phishing communication may appear at a previous timestamp in the mailbox (for example, one week before) and the second simulated phishing communication may appear as a chain (or follow-on) message at a recent timestamp. This may cause the user to believe they have failed to respond to an important email, and this may lead to them being less diligent in assessing risk prior to responding or interacting with the simulated phishing communication.

The use of API's may allow direct injection module 218 to modify messages that are already in the user's mailbox. For example, direct injection module 218 may select a message with hyperlinks that is in the user's mailbox and modify the hyperlinks by replacing them with simulated phishing links. Direct injection module 218 may then change one or more attributes of the message (which is now a simulated phishing communication) such that the user can recognize the message as suspicious. For example, direct injection module 218 may change one or more words such that they are misspelled, may change the way that the email address of the sender is displayed, or may make any other change that makes the simulated phishing communication recognizable as a phishing attack. In some examples, direct injection module 218 may clone a message that is in a user's mailbox and change the cloned message into a simulated phishing communication that is directly injected into a user's mailbox. In some examples, direct injection module 218 may select user messages from specific folders in the user's mailbox to modify into simulated phishing communications, for example the deleted items folder or an archive folder. In an example direct injection module 218 may select a message in one user's mailbox and create a simulated phishing communication from the message and directly inject the simulated phishing communication into one or more different user's mailboxes. In some examples, direct injection module 218 may modify the status or importance of a simulated phishing communication in a user's inbox. In some examples, direct injection module 218 may cause the simulated phishing communication to appear to have been opened or read, or to appear to be unread or unopened in a user's inbox. In examples, direct injection module 218 may add flags or reminders to the simulated phishing communication to attempt to create a sense of urgency in the user.

In some organizations, direct injection techniques may not be permitted due to policies preventing the same. In some instances direct injection module 218 or the system administrator may not be able to perform the direct injection of the simulated phishing communications to the user due to various reasons. In examples, direct injection module 218 or the system administrator may not be granted a security token to use the API. In situations where direct injection may not be feasible or otherwise available, security awareness training system 202 may have to communicate the simulated phishing communications to user's mailboxes using SMTP. Also as previously described, with or without whitelisting, it may not be known with certainty whether all simulated phishing communications would be delivered to the users via SMTP or whether some or all of the simulated phishing communications will be blocked, modified, or interacted with by security system 236.

In embodiments where simulated phishing campaigns are to be sent via SMTP and where the system administrator creates simulated phishing campaigns, simulated phishing campaign manager 214, with the knowledge of which simulated phishing communications can be reliably delivered to the mailbox of one or more users in an organization, may adapt to a range of options that are presented to the system administrator for selection to create the simulated phishing campaigns. In embodiments where simulated phishing communications are placed into a user's mailbox through direct injection and where the system administrator creates simulated phishing campaigns, simulated phishing campaign manager 214, with the knowledge that all simulated phishing communications can be reliably delivered to the mailbox of one or more users in an organization, may adapt to a range of options that are presented to the system administrator for selection to create the simulated phishing campaigns. In examples, this may be the widest range of options that security awareness training system 202 supports. As a result, the system administrator may be able to design and configure simulated phishing campaigns with certainty that all of the simulated phishing communications will be delivered to the user's mailbox.

In some examples, simulated phishing campaign manager 214 may create simulated phishing campaigns. In examples, simulated phishing campaign manager 214 may require information on simulated phishing communications that would successfully be allowed to pass by security system 236 without being blocked, modified, or interacted with when creating simulated phishing campaigns. To provide the security awareness system with awareness of a range of options for the design and configuration of a simulated phishing campaign such that all simulated phishing communications would reach the user, the system administrator may choose to run a delivery verification campaign.

As described earlier, in instances where security system 236 determines that the simulated phishing communications are not malicious or does not detect any presence of malicious elements in the simulated phishing communications, security system 236 may allow email system 204 to deliver the simulated phishing communications. The simulated phishing communications that are allowed by security system 236 may have to be identified to determine one or more reasons as to why security system 236 may have allowed the simulated phishing communications. In many instances, identifying the simulated phishing communications that are allowed by security system 236 may be tedious and may require a lot of computing resources. To identify the simulated phishing communications that are allowed by security system 236, security awareness training system 202 may initiate the delivery verification campaign.

As a part of the delivery verification campaign, delivery verification module 216 may identify one or more email accounts of email system 204 with security system 236 to use for the delivery verification campaign. In an implementation, delivery verification module 216 may create one or more test email accounts in the organization's domain(s) for the purposes of the delivery verification campaign. In an implementation, delivery verification module 216 may have credentials to access the one or more test email accounts. In some implementations, the one or more email accounts may be existing email accounts of users. In examples, delivery verification module 216 may obtain credentials to access the existing one or more email accounts from the system administrator. In some implementations, the system administrator may create one or more test email accounts and share credentials with delivery verification module 216.

In an implementation, security awareness training system 202 (or a component therein, such as simulated phishing campaign manager 214) may select one or more types of simulated phishing communications from a plurality of types of simulated phishing communications. The plurality of types of simulated phishing communications include any of a simulated phishing email with attachment, a simulated phishing email with one or more links and a simulated phishing email with a macro. Security awareness training system 202 (or a component therein, such as simulated phishing campaign manager 214) may configure the delivery verification campaign to include the selection of the one or more types of the simulated phishing communications from the plurality of types of simulated phishing communications. In some embodiments, each of the one or more types of simulated phishing communications may be selected to be communicated separately to be tested for delivery in delivery verification campaign. For example, simulated phishing campaign manager 214 may choose one or more representative simulated phishing communications that include attachments, one or more representative simulated phishing communications that include links, one or more representative simulated phishing communications that include macros, and one or more representative simulated phishing communications that include any other element. The representative simulated phishing communications of a test set may be emails that include different types of simulated attacks, such as links, different attachment types (.doc, .docx, .xls, .xlsx, .pdf et al.), and other content designed to test the security awareness of the user.

With the test set of simulated phishing communications, simulated phishing campaign manager 214 may configure the delivery verification campaign. The delivery verification campaign is a campaign configured to send one or more examples of each of the simulated phishing communications to the one or more test accounts in the organization's domain.

Security awareness training system 202 may communicate the one or more types of simulated phishing communications of the delivery verification campaign to the one or more email accounts through security system 236 in the same way as they would if they were addressed to a user of the organization.

Delivery verification module 216 may determine whether or not each of the one or more types of simulated phishing communications was received via the security system at the one or more email accounts. In one or more embodiments, delivery verification module 216 may access the one or more email accounts to determine whether or not each of the one or more types of simulated phishing communications was received at the one or more email accounts without having been blocked, interacted with or modified by the security system 236. In one implementation, delivery verification module 216 may have credentials to login to the one or more email accounts created for the delivery verification campaign. In some implementations, delivery verification module 216 may use administrator privileges to login to the one or more user email accounts to determine whether or not each of the one or more types of simulated phishing communications was received at the one or more email accounts. In some examples, after logging in to the one or more email accounts, delivery verification module 216 may determine that at least one of the one or more types of simulated phishing communications was successfully communicated through security system 236 to the one or more email accounts. In one implementation, delivery verification module 216 may determine the message identifiers of at least one of the one or more types of simulated phishing communications. In implementations, delivery verification module 216 may determine whether the at least one of the one or more types of simulated phishing communications was received unchanged at the one or more email accounts. In one implementation, delivery verification module 216 may examine the one or more messages received in the one or more email accounts to determine whether at least one of the one or more types of simulated phishing communications were received unchanged at the one or more email accounts. Delivery verification module 216 may examine some portion of or all of the content of the one or more messages received in the one or more email accounts. In some implementations, delivery verification module 216 may compare content of at least one of the one or more types of simulated phishing communications that was received with the simulated phishing communication that was originally communicated. In an embodiment, delivery verification module 216 may review some elements of the simulated phishing communication to determine that at least one of the one or more types of simulated phishing communications was received unchanged at the one or more email accounts. For example, delivery verification module 216 may scan the simulated phishing communications having simulated phishing content as an attachment to determine if the attachment was received unchanged or modified. In another example, delivery verification module 216 may compare the simulated phishing communications having an embedded link with the simulated phishing communications having an original embedded link that was sent to the one or more email accounts to determine if the embedded link was received unchanged.

On identifying that the one or more types of simulated phishing communications were successfully communicated unmodified to the one or more email accounts without having been blocked, interacted with or modified by the security system 236, delivery verification module 216 may analyze those simulated phishing communications to determine one or more reasons as to why those simulated phishing communications were not blocked by security system 236. Delivery verification module 216 may share and store information obtained from the determination with simulated phishing campaign manager 214 for future campaign configurations. Simulated phishing campaign manager 214 may use the information to design a simulated phishing campaign for a plurality of email accounts of email system 204 based at least on the one or more types of simulated phishing communications that were successfully communicated unmodified to the one or more email accounts without having been blocked, interacted with or modified by the security system 236.

Also, delivery verification module 216 may identify the type of the at least one of the one or more types of simulated phishing communications that were received at the one or more email accounts with content changed. Delivery verification module 216 may examine the changes in the type of at least one of the one or more types of simulated phishing communications whose content was changed. Delivery verification module 216 may share the identified changes along with any information with simulated phishing campaign manager 214 to consider for future designs of simulated phishing campaigns.

Furthermore, delivery verification module 216 may identify one or more simulated phishing communications of the one or more types of simulated phishing communications which were not received at the one or more email accounts. Delivery verification module 216 may identify the type of simulated phishing communication that was not received. For example, delivery verification module 216 may determine that the simulated phishing communication having an attachment that is an executable file is not received at the one or more email accounts. In examples, delivery verification module 216 may determine that at least one of the one or more types of simulated phishing communications was not successfully communicated beyond security system 236 to the one or more email accounts. In one embodiment, delivery verification module 216 may communicate with security system 236 or email system 204 to determine that at least one of the one or more types of simulated phishing communications was not successfully communicated beyond security system 236 to the one or more email accounts. Delivery verification module 216 may share and store information obtained from the determination with simulated phishing campaign manager 214 for future campaign configurations. Simulated phishing campaign manager 214 may store the simulated phishing messages that were successfully received at one or more email accounts and the results of the determination in simulated phishing communication template storage 222. Simulated phishing campaign manager 214 may provide range of options based on the determination and learning such that if the system administrator initiates the creation of a security awareness program for their organization, for example using KnowBe4's Automated Security Awareness Program (ASAP) or similar system, the system administrator may be able to select one or more types of simulated phishing communications that are guaranteed to reach the accounts of the users.

In some examples, simulated phishing campaign manager 214 may use the determination of which simulated phishing communications are successfully delivered to the test accounts without modification as an input to whitelisting, thereby increasing the probability that whitelisting will be more comprehensive, thereby increasing the range of types of simulated phishing communications that can be included in simulated phishing campaigns with confidence that the simulated phishing communications can be allowed to pass by security system 236 without being blocked, interacted with, or modified.

Figure 3:
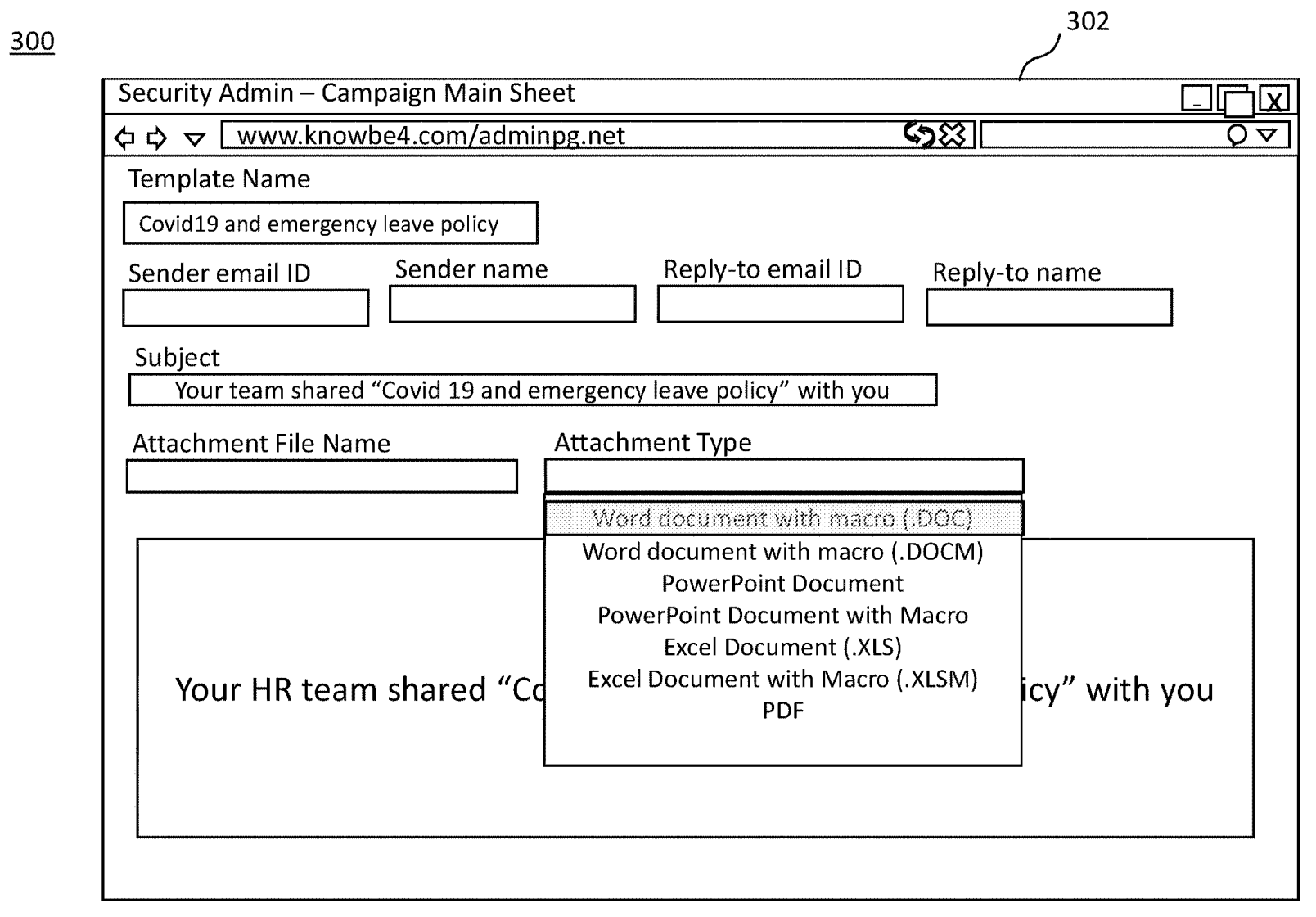

FIG. 3 depicts a graphical user interface 300 of a system administrator view 302 for configuring a simulated phishing campaign. In an implementation, delivery verification module 216 may present a range of options for simulated phishing communications to security awareness training system 202 for designing and configuration of simulated phishing campaigns including the simulated phishing communications. In an example, upon determination of which simulated phishing communications can be reliably delivered to a user (or users), security awareness training system 202 may adapt the range of options for the simulated phishing communications. In an example, security awareness training system 202 may present a range of options to the system administrator for selection when the system administrator configures a simulated phishing campaign. Accordingly, some attachment types may not be presented to the system administrator. For example, in some situations, options for attachments with macros may not be presented to the system administrator if security awareness training system 202 has learned through delivery verification module 216 that simulated phishing communications including attachments with macros may not be successfully delivered to the user's mailbox.

In an implementation, security awareness training system 202 may adapt the range of options presented to the system administrator based upon knowledge of how the simulated phishing campaign will be delivered and with knowledge of which simulated phishing communications will successfully be allowed to pass by email system 204 without being blocked, modified, and/or interacted with. As a result, the system administrator can design and configure the simulated phishing campaign with certainty that all of the simulated phishing communications will be delivered to the user's mailbox. FIG. 3 shows a template for a simulated phishing communication of the simulated phishing campaign in the form of an email. In the example of FIG. 3, the template name is "Covid19 and emergency leave policy" and subject is "Your team shared "Covid 19 and emergency leave policy" with you". Further, in an example of FIG. 3, the system administrator may be presented with options— "Word document with macro (.DOCM)", "PowerPoint Document", "PowerPoint Document with Macro", "Excel Document (ALS)", "Excel Document with Macro (.XLSM)", and "PDF". As can be seen in FIG. 3, the system administer selects the option "Word document with macro (.DOCM)" for configuring the simulated phishing campaign. Accordingly, the email including a word document with a macro may be successfully delivered to the user's mailbox.

Figure 4:
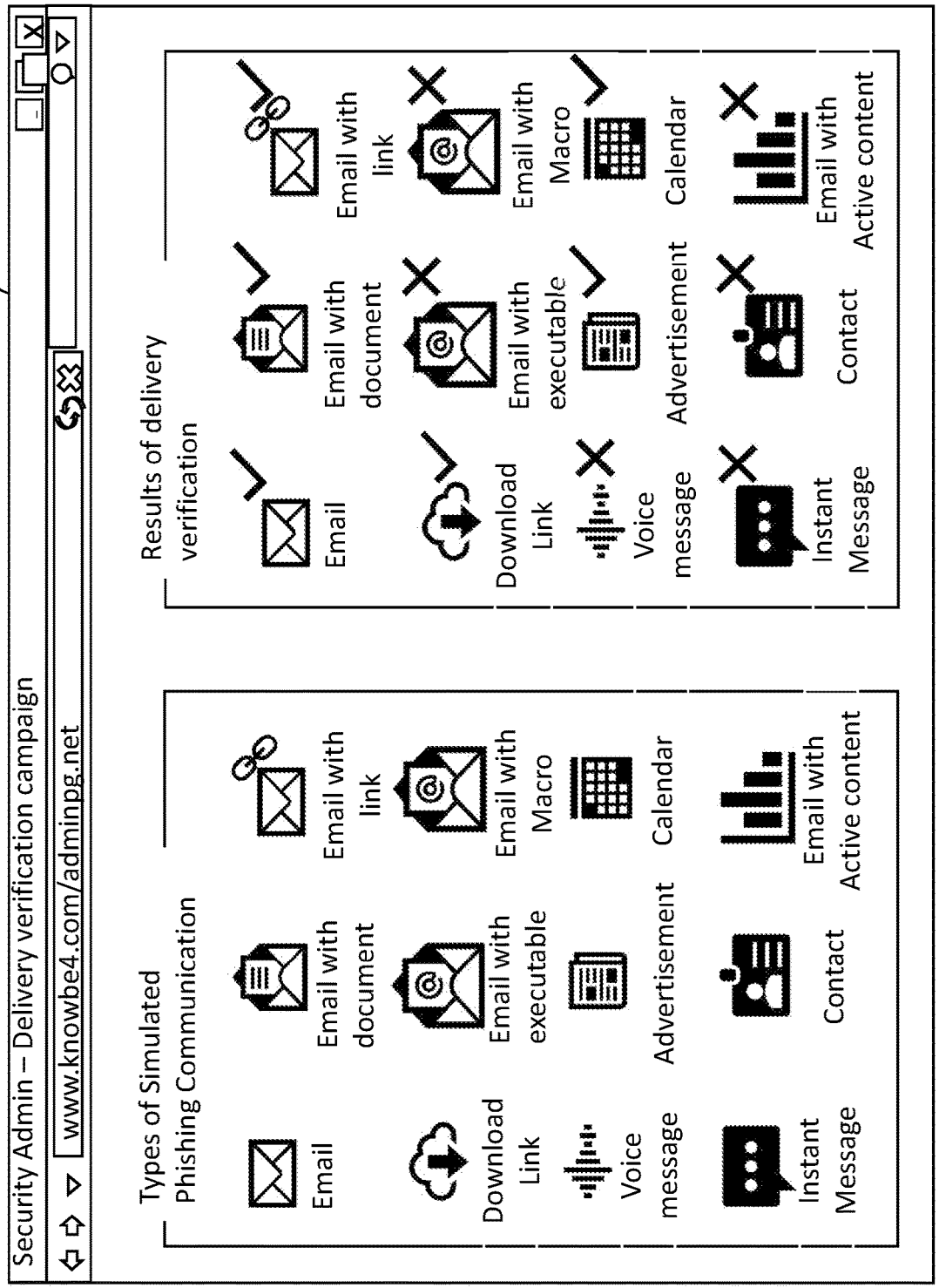
FIG. 4 depicts a graphical user interface of a system administrator view displaying various types of simulated phishing communications, according to some embodiments.

FIG. 4 depicts a graphical user interface 400 of a system administrator view 402 displaying various types of simulated phishing communications and types of simulated phishing communications that were successfully communicated unmodified to one or more email accounts without having been blocked, interacted with or modified by the security system 236.

In the example, system administrator view 402 illustrates graphical icons representing the type of simulated phishing communications that were recently used on a left panel. The type of simulated phishing communications that were recently used may include an email, an email with a document, an email with a link, an email message with external document download link, an email with executable file as an attachment, an email with document having macro, a voice message as an attachment, an email having an advertisement (includes links), a calendar invite (having links), a missed instant message sent in email (includes link), a contact card as an attachment in the email and an email with active content (includes links or macros). The right panel of system administrator view 302 illustrates graphical icons representing the type of simulated phishing communications that were successfully received without changes or blocked at the one or more email accounts without having been blocked, interacted with or modified by the security system 236. The right panel of system administrator view 402 illustrates the type of simulated phishing communications that were successfully received without changes by security system 236 with a tick/check mark ("✓"). The type of simulated phishing communications that were not received or blocked are indicated with a cross mark ("X"). The type of simulated phishing communications that were successfully received include an email, an email with a document, an email with a link, an email message with external document download link, an email having an advertisement (which may includes links), and a calendar invite (which may include links). The type of simulated phishing communications that that were blocked or modified include an email with executable file as attachment, an email with document having macro, a voice message as an attachment, a missed instant message sent in an email (which may include links), a contact card as an attachment in the email and an email with active content (which may include links or macros). In embodiments, the system administrator may be able to quickly and with little effort understand the range of options available to send the simulated phishing communications while planning for a simulated phishing campaign through system administrator view 402.

Figure 5:
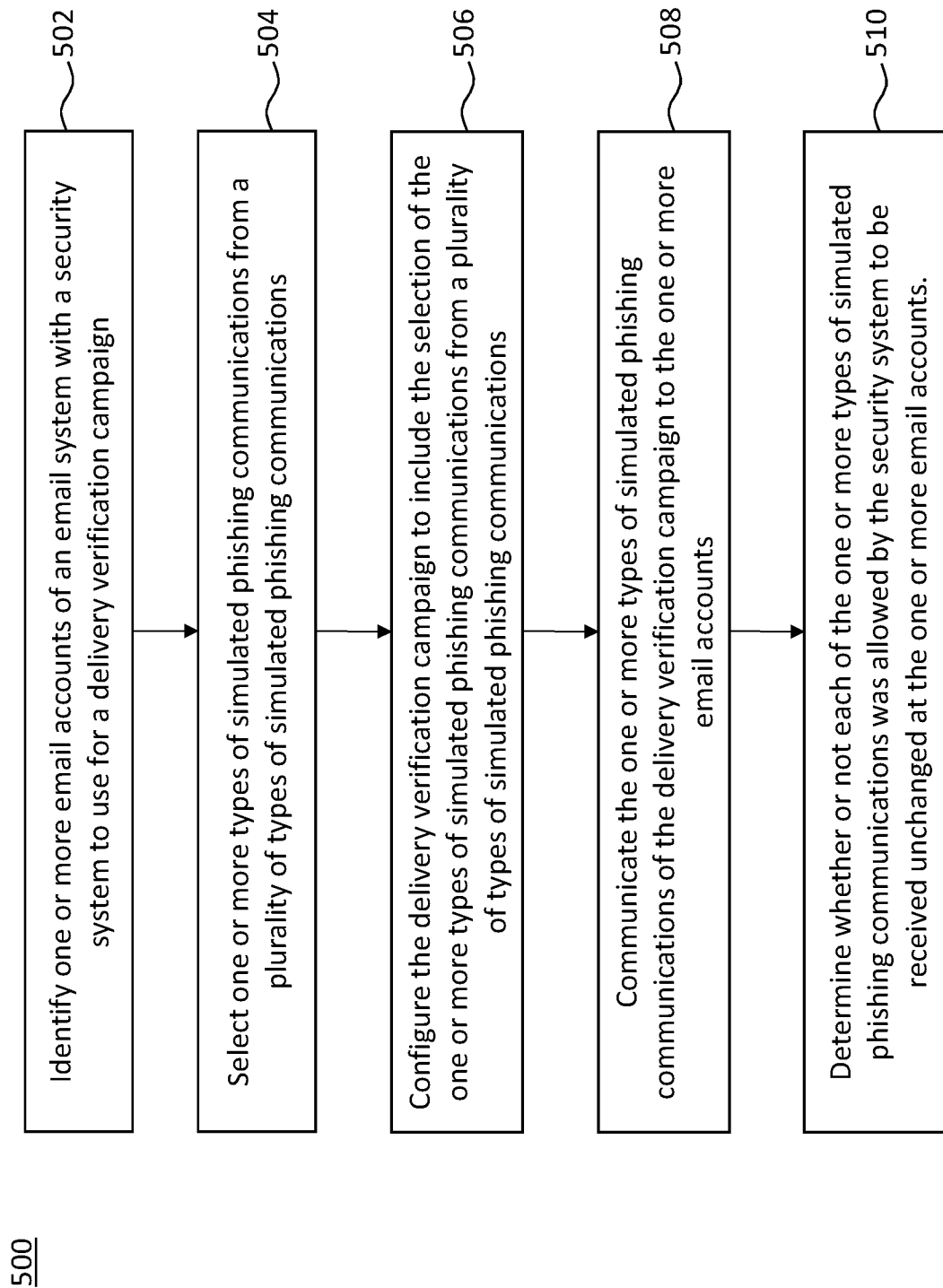
FIG. 5 depicts a process flow for conducting a delivery verification campaign, according to some embodiments.

FIG. 5 depicts a process flow 500 for conducting a delivery verification campaign, according to some embodiments.

Step 502 includes identifying one or more email accounts of email system 204 with security system 236 to use for a delivery verification campaign. In an implementation, simulated phishing campaign manager 214 may identify the one or more email accounts of email system 204 with security system 236 to use for the delivery verification campaign.

Step 504 includes selecting one or more types of simulated phishing communications from a plurality of types of simulated phishing communications. In an example, the plurality of types of simulated phishing communications includes any of the following: a simulated phishing email with an attachment, a simulated phishing email with one or more links and a simulated phishing email with a macro. In an implementation, simulated phishing campaign manager 214 may select the one or more types of simulated phishing communications from the plurality of types of simulated phishing communications. Security awareness training system 202 may retrieve the simulated phishing communications from simulated phishing communication storage 222. In an implementation, security awareness training system 202 may present the plurality of types of simulated phishing communications to the system administrator for selection of one or more types of simulated phishing communications.

Step 506 includes configuring the delivery of a verification campaign to include the selection of one or more types of simulated phishing communications from the plurality of types of simulated phishing communications. In an implementation, security awareness training system 202 (or a component therein, such as simulated phishing campaign manager 214) may configure the delivery verification campaign to include the selection of the one or more types of simulated phishing communications from the plurality of types of simulated phishing communications. In an example, security awareness training system 202 may present the selection of the one or more simulated phishing communications to the system administrator. Based on the selection of the one or more types of simulated phishing communications, the system administrator may configure the delivery verification campaign.

Step 508 includes communicating the simulated phishing communications of the delivery verification campaign to the one or more email accounts. In an implementation, security awareness training system 202 (or a component therein, such as simulated phishing campaign manager 214) may communicate the one or more types of simulated phishing communications of the delivery verification campaign to one or more email accounts.

Step 510 includes determining whether or not each of the one or more types of simulated phishing communications was received at the one or more email accounts, without having been blocked, interacted with or modified by security system 236. In an implementation, security awareness training system 202 (or a component therein, such as delivery verification module 216) may determine whether or not each of the one or more types of simulated phishing communications was received at the one or more email accounts without having been blocked, interacted with or modified by security system 236. In an implementation, security awareness training system 202 may access one or more email accounts to examine one or more messages received in the one or more email accounts. Security awareness training system 202 may access the one or more email accounts using credentials. In an example, security awareness training system 202 may determine that one or more types of simulated phishing communications was successfully communicated through security system 236 to one or more email accounts. Security awareness training system 202 may determine that at least one of the one or more types of simulated phishing communications was received unchanged at one or more email accounts.

In an implementation, security awareness training system 202 may determine that at least one of the one or more types of simulated phishing communications was not received at the one or more email accounts. Security awareness training system 202 may determine that at least one of the one or more types of simulated phishing communications was not successfully communicated beyond the security system to the one or more email accounts. Security awareness training system 202 may identify the type of the at least one of the one or more types of simulated phishing communications that was not received. In an implementation, security awareness training system 202 may display the one or more types of simulated phishing communications that were successfully communicated unmodified to the one or more email accounts without having been blocked, interacted with or modified by security system 236 for selection in configuring a simulated phishing campaign. Security awareness training system 202 may configure the simulated phishing campaign to a plurality of emails accounts of email system 204 based at least on the one or more types of simulated phishing communications that were successfully communicated unmodified to the one or more email accounts without having been blocked, interacted with or modified by security system 236.

Various embodiments of the methods and systems have been described that ensure that simulated phishing messages are received at the users' accounts through direct injection or through SMTP. With simulated phishing messages successfully delivered, unmodified to the user's mailboxes, the users may respond based on their security awareness. As a result, security awareness training system 202 may be able to analyze and determine a user's security awareness based on the user's response to simulated phishing messages. Consequently, security awareness training system 202 may be able to generate accurate and reliable reports of metrics related to how the user does or does not interact with those simulated phishing communications, which may enable the system administrator to obtain an accurate picture of the user's security awareness and provide remedial measures to improve the security awareness of the user or group of users.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method comprising:
identifying, by one or more processors, one or more test accounts of an email system with a security system;
communicating, by the one or more processors, a simulated phishing communication of a type of simulated phishing communication to the one or more test accounts;
determining, by the one or more processors, by accessing the one or more test accounts whether the simulated phishing communication was one of interacted with or modified by the security system;
identifying, by the one or more processors responsive to the determination, a change in content of the simulated phishing communication; and
providing, by the one or more processors, the identified change to a simulated phishing campaign manager for use in creating for a simulated phishing campaign one or more simulated phishing communications that bypass being interacted with or being modified by the security system, the simulated phishing campaign configured to test if one or more users recognize a malicious phishing communication; and
providing, by the one or more processors, the one or more simulated phishing communications to one or more user mailboxes of the email system such that one or more simulated phishing communications bypass being interacted with or being modified by the security system.

2. The method of claim 1, further identifying, by the one or more processors, the type of simulated phishing communication from a plurality of types of simulated phishing communications.

3. The method of claim 2, wherein the plurality of types of simulated phishing communications comprise at least one or more of the following: a simulated phishing email with an attachment, a simulated phishing email with one or more links, and a simulated phishing email with a macro.

4. The method of claim 1, further comprising creating, by the one or more processors, the one or more simulated phishing communications based at least on the type of simulated phishing communication.

5. The method of claim 1, further comprising providing, by the one or more processors, based at least on the identified change, one or more options for creating the one or more simulated phishing communications.

6. The method of claim 5, wherein the one or more options comprise one or more of the following: a simulated phishing communication template, a type of phishing attack and a type of attachment.

7. The method of claim 5, further comprising presenting, via a user interface, the one or more options for creating the one or more simulated phishing communications.

8. The method of claim 1, further comprising accessing, by the one or more processors, the one or more test accounts to determine the simulated phishing communication was one of interacted with or modified by the security system.

9. The method of claim 1, further comprising accessing, by an administrative user, the one or more test accounts to determine whether the simulated phishing communication was one of interacted with or modified by the security system.

10. The method of claim 1, further comprising determining that the simulated phishing communication was blocked by the security system.

11. A system comprising:
one or more processors, coupled to memory, and configured to:
identify one or more test accounts of an email system with a security system;
communicate a simulated phishing communication of a type of simulated phishing communication to the one or more test accounts;
determine by accessing the one or more test accounts whether the simulated phishing communication was one of interacted with or modified by the security system;
identify, responsive to the determination, a change in content of the simulated phishing communication; and
provide the identified change to a simulated phishing campaign manager for use in creating for a simulated phishing campaign one or more simulated phishing communications that bypass being interacted with or being modified by the security system, the simulated phishing campaign configured to test if one or more users recognize a malicious phishing communication; and
provide the one or more simulated phishing communications to one or more user mailboxes of the email system such that one or more simulated phishing communications bypass being interacted with or being modified by the security system.

12. The system of claim 11, wherein the one or more processors are further configured to identify the type of simulated phishing communication from a plurality of types of simulated phishing communications.

13. The system of claim 12, wherein the plurality of types of simulated phishing communications comprise at least one or more of the following: a simulated phishing email with an attachment, a simulated phishing email with one or more links, and a simulated phishing email with a macro.

14. The system of claim 11, wherein the one or more processors are further configured to create the one or more simulated phishing communications based at least on the type of simulated phishing communication.

15. The system of claim 11, wherein the one or more processors are further configured to provide, based at least on the identified change, one or more options for creating the one or more simulated phishing communications.

16. The system of claim 15, wherein the one or more options comprises one or more of the following: a simulated phishing communication template, a type of phishing attack and a type of attachment.

17. The system of claim 15, wherein the one or more processors are further configured to present, via a user interface, the one or more options for creating the one or more simulated phishing communications.

18. The system of claim 11, wherein the one or more processors are further configured to access the one or more test accounts to determine the simulated phishing communication was one of interacted with or modified by the security system.

19. The system of claim 11, wherein the one or more processors are further configured to determine that the simulated phishing was blocked by the security system.

* * * * *